US008025722B2

(12) United States Patent
Kawabe et al.

(10) Patent No.: US 8,025,722 B2
(45) Date of Patent: Sep. 27, 2011

(54) INK JET INK, INK JET RECORDING METHOD, INK CARTRIDGE, RECORDING UNIT AND INK JET RECORDING APPARATUS

(75) Inventors: Minako Kawabe, Koganei (JP); Hiroshi Tomioka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 329 days.

(21) Appl. No.: 12/393,689

(22) Filed: Feb. 26, 2009

(65) Prior Publication Data
US 2009/0238977 A1 Sep. 24, 2009

(30) Foreign Application Priority Data
Mar. 19, 2008 (JP) .................. 2008-072276

(51) Int. Cl.
C09D 11/02 (2006.01)
B41J 2/01 (2006.01)
(52) U.S. Cl. ............... 106/31.58; 106/31.49; 106/31.78; 106/31.86; 106/31.87; 347/100
(58) Field of Classification Search .............. 106/31.58, 106/31.49, 31.86, 31.87, 31.78; 347/100; 427/256
See application file for complete search history.

(56) References Cited

U.S. PATENT DOCUMENTS

| 4,365,998 | A | * | 12/1982 | Sugiyama et al. | 106/31.49 |
| 4,723,129 | A | | 2/1988 | Endo et al. | 346/1.1 |
| 4,740,796 | A | | 4/1988 | Endo et al. | 346/1.1 |
| 4,840,674 | A | * | 6/1989 | Schwarz | 106/31.43 |
| 5,205,861 | A | * | 4/1993 | Matrick | 106/31.58 |
| 5,300,143 | A | * | 4/1994 | Schwarz, Jr. | 106/31.43 |
| 5,580,373 | A | * | 12/1996 | Lane et al. | 106/31.49 |
| 5,738,932 | A | | 4/1998 | Kondo et al. | 428/195 |
| 5,804,320 | A | | 9/1998 | Tomioka et al. | 428/478.2 |
| 5,955,185 | A | | 9/1999 | Yoshino et al. | 428/304.4 |
| 5,965,252 | A | | 10/1999 | Santo et al. | 428/329 |
| 5,994,427 | A | * | 11/1999 | Kappele et al. | 106/31.75 |
| 6,412,936 | B1 | * | 7/2002 | Mafune et al. | 347/100 |

(Continued)

FOREIGN PATENT DOCUMENTS

EP 0940453 A1 9/1999

(Continued)

OTHER PUBLICATIONS

Mar. 23, 2010 European Search Report in European Patent Application No. 09155510.2.

(Continued)

Primary Examiner — Helene Klemanski
(74) Attorney, Agent, or Firm — Fitzpatrick, Cella, Harper & Scinto

(57) ABSTRACT

An ink jet ink is provided which contains at least a coloring material and a water-soluble organic solvent, where the water-soluble organic solvent contains a branched alkanediol having hydroxyl groups at both terminals of its main chain and at least one of a compound represented by the following general formula (1) and a compound represented by the following general formula (2):

$R_1\text{-[A]-}R_2$   General formula (1)

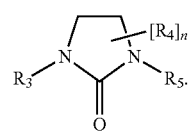

General formula (2)

15 Claims, 9 Drawing Sheets

U.S. PATENT DOCUMENTS

| | | | |
|---|---|---|---|
| 6,460,989 B1 | 10/2002 | Yano et al. | 347/101 |
| 6,517,199 B1 | 2/2003 | Tomoika et al. | 347/101 |
| 6,536,890 B1 | 3/2003 | Kato et al. | 347/100 |
| 6,558,740 B1 | 5/2003 | Santo et al. | 427/146 |
| 6,565,950 B1 | 5/2003 | Tomioka et al. | 428/195 |
| 6,659,601 B2 | 12/2003 | Goto et al. | 347/100 |
| 6,685,999 B2 | 2/2004 | Ichinose et al. | 428/32.25 |
| 6,719,420 B2 | 4/2004 | Tomioka et al. | 347/100 |
| 6,729,718 B2 | 5/2004 | Goto et al. | 347/100 |
| 6,746,114 B2 | 6/2004 | Takahashi et al. | 347/100 |
| 6,821,328 B2 | 11/2004 | Tomioka et al. | 106/31.33 |
| 6,830,709 B2 | 12/2004 | Tomioka et al. | 252/506 |
| 6,863,391 B2 | 3/2005 | Tomioka et al. | 347/100 |
| 6,966,944 B2 | 11/2005 | Shimomura et al. | 106/31.43 |
| 7,025,817 B2 | 4/2006 | Kanke et al. | 106/31.51 |
| 7,198,837 B1 | 4/2007 | Endo et al. | 428/195.1 |
| 7,208,033 B2 | 4/2007 | Kawabe et al. | 106/31.48 |
| 7,229,166 B2 | 6/2007 | Tomioka et al. | 347/100 |
| 7,244,299 B2 | 7/2007 | Tsuji et al. | 106/31.48 |
| 7,297,194 B2 | 11/2007 | Shinjo et al. | 106/31.27 |
| 7,364,770 B2 | 4/2008 | Nagashima et al. | 427/215 |
| 7,445,666 B2 | 11/2008 | Yanagimachi et al. | 106/31.47 |
| 7,578,585 B2 * | 8/2009 | Yamakami et al. | 347/100 |
| 2006/0176349 A1 | 8/2006 | Nagai et al. | |
| 2006/0194897 A1 | 8/2006 | Kawabe et al. | 523/160 |
| 2007/0109378 A1 | 5/2007 | Yamakami et al. | 347/100 |
| 2007/0109390 A1 | 5/2007 | Yamakami et al. | |
| 2007/0148376 A1 | 6/2007 | Tomioka et al. | 428/32.1 |
| 2008/0007606 A1 * | 1/2008 | Yanagimachi et al. | 106/31.86 |
| 2008/0136862 A1 | 6/2008 | Kawabe et al. | 347/29 |
| 2008/0151028 A1 | 6/2008 | Yamakami et al. | 347/100 |
| 2008/0274284 A1 | 11/2008 | Fujimoto et al. | 427/256 |
| 2009/0238974 A1 * | 9/2009 | Kawabe et al. | 427/256 |
| 2009/0238975 A1 * | 9/2009 | Yamakami et al. | 427/256 |
| 2009/0238976 A1 * | 9/2009 | Ishii et al. | 427/256 |
| 2009/0274840 A1 * | 11/2009 | Yamakami et al. | 427/256 |

FOREIGN PATENT DOCUMENTS

| | | |
|---|---|---|
| EP | 0940455 A1 | 9/1999 |
| EP | 1354921 A2 | 10/2003 |
| EP | 1995287 A1 | 11/2008 |
| JP | 3-255171 | 11/1991 |
| JP | 5-70726 | 3/1993 |
| JP | 2000-297237 | 10/2000 |
| JP | 2005-298813 | 10/2005 |
| JP | 2007-39680 | 2/2007 |
| JP | 2007-106109 A | 4/2007 |

OTHER PUBLICATIONS

Apr. 14, 2011 Chinese Official Action in Chinese Patent Application No. 200910129413.9.

* cited by examiner

INK JET INK, INK JET RECORDING METHOD, INK CARTRIDGE, RECORDING UNIT AND INK JET RECORDING APPARATUS

BACKGROUND OF THE INVENTION

1. Field of the Invention

This invention relates to an ink jet ink, an ink jet recording method, an ink cartridge, a recording unit and an ink jet recording apparatus.

2. Description of the Related Art

When images are formed by using an ink jet recording method, there may come about a state that ink is not ejected for a certain time period from ejection orifices of a recording head in a process of scanning of the recording head. That is, intermittent ejection stability may be not well achievable.

In order to resolve such a problem, inks as shown below are proposed. For example, Japanese Patent Laid-open Application No. H03-255171 discloses a report relating to an ink which contains an alkylene glycol having 7 or more carbon atoms. Japanese Patent Laid-open Application No. 2000-297237 also discloses a report relating to an ink which contains an ethylene glycol type organic solvent. Japanese Patent Laid-open Application No. H05-70726 further discloses a report relating to an ink which contains a dicarboxylic acid monoester.

Japanese Patent Laid-open Application No. 2005-298813 discloses, as an ink which can keep recorded materials from curling and also can achieve ejection stability, a report relating to an ink which contains water-soluble compounds different in water-retentive force under environments of stated temperature and humidity. Japanese Patent Laid-open Application No. 2007-39680 discloses, as an ink which can achieve ejection stability, a report relating to an ink which contains water, a coloring material, 1,5-pentanediol and a humectant or an ink having a property that it changes into a liquid from a gel or solid depending on conditions such as temperature and humidity.

About the conventional inks as above, the present inventors have ascertained how far they have the intermittent ejection stability. As the result, they have found the following. That is, these inks all intend to improve intermittent ejection stability in an environment of low temperature and low humidity as having conventionally been so aimed. Hence, these have been found to have no problem even where they are used in an ink jet recording apparatus of about 10 pL (picoliters) in ejection volume in an environment of, e.g., low temperature and low humidity, normal temperature and normal humidity, or normal temperature and low humidity. Stated specifically, these inks have been found to have no problem on the intermittent ejection stability in an environment of normal temperature and normal humidity, such as temperature 25° C. and relative humidity 60%, in an environment of normal temperature and low humidity, such as temperature 25° C. and relative humidity 20%, or in an environment of low temperature and low humidity, such as temperature 15° C. and relative humidity 10%. It should be noted that, the problem of the intermittent ejection stability resulting from the evaporation of water or the like hardly arises under a high-humidity (for example, relative humidity of 80 to 90%) irrespective to the temperature.

SUMMARY OF THE INVENTION

However, according to studies made by the present inventors, these inks have an insufficient intermittent ejection stability in such an environment of high temperature and low humidity (e.g., temperature 30° C. and relative humidity 10 to 20%), in which the water and so forth in ink tends to evaporate more than in the environment of low temperature and low humidity. Thus, there is room for improvement. In particular, these inks have been found to be of remarkably low intermittent ejection stability when a small-droplet ink is ejected which is of 5 pL or less, or further 2 pL or less, in ejection volume, or when an ink is ejected through ejection orifices having an extremely small diameter of less than 10 μm.

Meanwhile, the ink disclosed in Japanese Patent Laid-open Application No. 2007-39680, which intends to improve the intermittent ejection stability under environments of high temperature and low humidity, is insufficient in ink stability in the environment of low temperature and low humidity and is required to be ejected while the ink is kept warm at a stated temperature or more. Thus, the ink, which may require any make-up for being kept warm, has been found to be still unsatisfactory in order to be adaptable to various environments under simple make-up.

As the ink jet recording method has become popular in recent years, environments where recording apparatus are used are becoming great in variety, recording heads are being made minute and the recording is being made high-speed. Thus, it has come to be a necessary and indispensable technical problem to improve the stability of ink and the intermittent ejection stability.

Accordingly, an object of the present invention is to provide an ink jet ink which can not easily cause any precipitation or solidification of a coloring material even where the ink has been left to stand over a long period of time, i.e., has an excellent stability of ink, and moreover which is excellent in intermittent ejection stability not only in an environment of low temperature and low humidity but also in an environment of high temperature and low humidity.

Another object of the present invention is to also provide an ink jet recording method, an ink cartridge, a recording unit and an ink jet recording apparatus in all of which the above ink jet ink is used to thereby enable good formation of images stably even in various environments.

The above objects are achieved by the present invention as described below.

That is, the ink jet ink according to the present invention is an ink jet ink which contains at least a coloring material and a water-soluble organic solvent;

the water-soluble organic solvent contains a branched alkanediol having hydroxyl groups at both terminals of its main chain and at least one of a compound represented by the following general formula (1) and a compound represented by the following general formula (2):

$$R_1\text{-[A]-}R_2 \qquad \text{General Formula (1)}$$

wherein A is —S—, —S(=O)— or —S(=O)$_2$—; and $R_1$ and $R_2$ are each independently a hydrogen atom, a hydroxyl group, an alkyl group, a hydroxyalkyl group, an alkenyl group, an acyl group, a carbamoyl group, a carboxyl group or a sulfonyl group, provided that $R_1$ and $R_2$ are not simultaneously hydrogen atom(s) and/or hydroxyl group(s); and General formula (2)

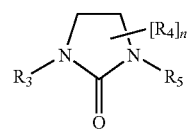

wherein $R_3$ and $R_5$ are each independently a substituted or unsubstituted alkyl group having 1 to 4 carbon atoms, a hydrogen atom, a hydroxyl group, a carboxyl group or a sulfonyl group; $R_4$ is a hydrogen atom, hydroxyl group, substituted or unsubstituted alkyl group having 1 to 4 carbon atoms, carboxyl group or sulfonyl group which is bonded to any carbon atom except for the nitrogen atoms and carbonyl group that constitute the five-membered ring; and n is an integer of 0 to 4.

The ink jet recording method according to another embodiment of the present invention is an ink jet recording method in which an ink is ejected by an ink jet system to perform recording;

the ink is the ink jet ink which is constituted as described above.

The ink cartridge according to still another embodiment of the present invention is an ink cartridge having an ink storage portion storing an ink therein;

the ink is the ink jet ink which is constituted as described above.

The recording unit according to a further embodiment of the present invention is a recording unit having an ink storage portion storing an ink therein and a recording head for ejecting the ink therefrom;

the ink is the ink jet ink which is constituted as described above.

The ink jet recording apparatus according to a still further embodiment of the present invention is an ink jet recording apparatus having an ink storage portion storing an ink therein and a recording head for ejecting the ink therefrom;

the ink is the ink jet ink which is constituted as described above.

According to the present invention, an ink jet ink is provided which can exhibit as an ink a good stability of ink even where the evaporation of the water and so forth in ink has progressed, and further can achieve an excellent intermittent ejection stability even in various environments of low temperature and low humidity, high temperature and low humidity, and so forth. In addition, according to the present invention, the use of such an ink jet ink provides an ink jet recording method, an ink cartridge, a recording unit and an ink jet recording apparatus which enable good formation of images stably even in various environments.

Further features of the present invention will become apparent from the following description of exemplary embodiments with reference to the attached drawings.

DESCRIPTION OF THE EMBODIMENTS

Figure 1:
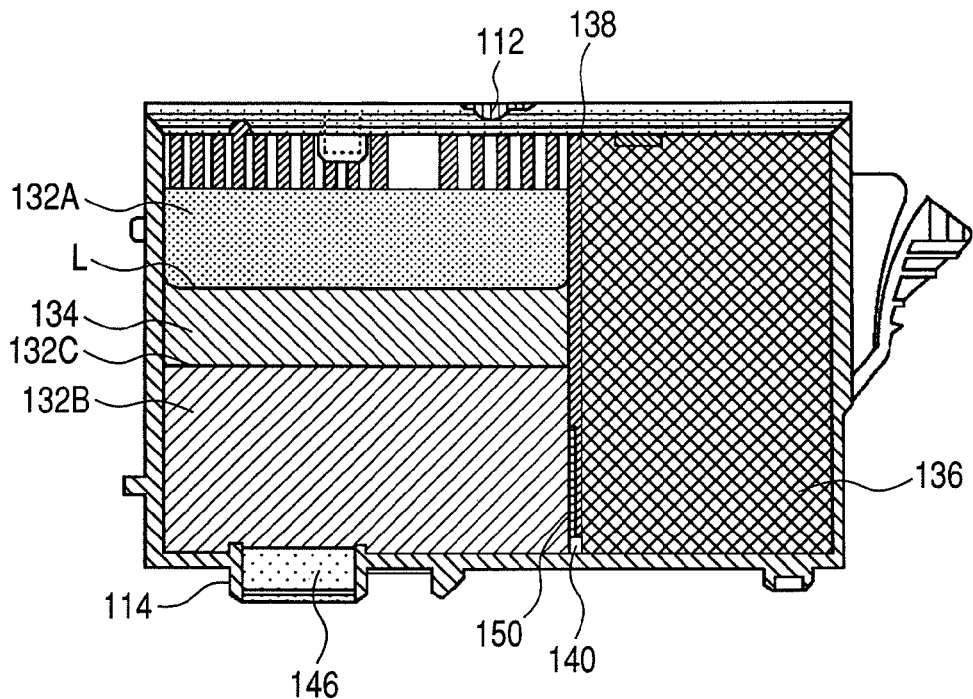
FIG. 1 is a schematic illustration of an ink cartridge.

The present invention is described below in greater detail by giving preferred embodiments. It should be noted that, in the present invention, a water-soluble organic solvent even if which is a solid at normal temperature (20 to 25° C.) is included in the category of "water-soluble organic solvents" when a component such as a coloring material can be dissolved or dispersed in an aqueous solution prepared by dissolving the water-soluble organic solvent in water.

In order to resolve the technical problems discussed above on the stability of ink and on the intermittent ejection stability, the present inventors have made studies chiefly on the type and content of water-soluble organic solvents used in ink jet inks (hereinafter simply also called "ink(s)"). Stated more specifically, they have made studies taking note of inks containing water-soluble organic solvents, in particular, alkanediol type water-soluble organic solvents. As the result, it has been found that, among the alkanediol type water-soluble organic solvents, a branched alkanediol having hydroxyl groups at both terminals of its main chain may be used, where the intermittent ejection stability is uniquely improved in both the environments of an environment of low temperature and low humidity and an environment of high temperature and low humidity. From this fact, the present inventors consider that such an excellent effect has been obtained because the molecular structure of the above alkanediol incorporated in the ink is one having hydroxyl groups at both terminals of its main chain and having a branch.

However, studies further made by the present inventors have revealed that the stability of ink is not sufficiently obtainable when the ink is incorporated as a water-soluble organic solvent with only the branched alkanediol having hydroxyl groups at both terminals of its main chain. Then, the reason therefor is considered to be that the branched alkanediol having hydroxyl groups at both terminals of its main chain is a bad solvent for the coloring material and hence the precipitation or solidification of the coloring material is more accelerated with the evaporation of the water and so forth in the ink. Here, the "bad solvent" refers to, where the coloring material is a dye, a water-soluble organic solvent in which the coloring material is low soluble, and, where the coloring material is a pigment, a water-soluble organic solvent which makes unstable the state of dispersion of the coloring material.

Accordingly, the present inventors have made studies on various inks which contain in combination the branched alkanediol having hydroxyl groups at both terminals of its main chain and a water-soluble organic solvent other than this. As the result, it has been found that a remarkable effect is obtainable when the water-soluble organic solvent to be used in combination is at least one of a compound represented by the following general formula (1) and a compound represented by the following general formula (2). More specifically, it has been found that the combination with any of these compounds not only brings an improvement in the stability of ink compared with the case in which only the branched alkanediol having hydroxyl groups at both terminals of its main chain is incorporated, but also brings effects beyond expectation as stated below. For example, the use in combination therewith can bring an excellent cooperative effect of more improving the intermittent ejection stability in both the environments of low temperature and low humidity and high temperature and low humidity, in particular, in the environment of high temperature and low humidity. Also, the ink in which the branched alkanediol having hydroxyl groups at both terminals of its main chain and at least one of the compound represented by the following general formula (1) and the compound represented by the following general formula (2) are used in combination can be an ink having much better intermittent ejection stability than an ink containing only the former or only the latter.

$$R_1\text{-}[A]\text{-}R_2 \quad \text{General formula (1)}$$

In the general formula (1), A is —S—, —S(=O)— or —S(=O)$_2$—. $R_1$ and $R_2$ are each independently a hydrogen atom, a hydroxyl group, an alkyl group, a hydroxyalkyl group, an alkenyl group, an acyl group, a carbamoyl group, a carboxyl group or a sulfonyl group, provided that $R_1$ and $R_2$ are not simultaneously hydrogen atom(s) and/or hydroxyl group(s).

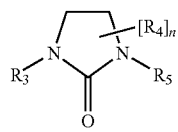

General formula (2)

In the general formula (2), $R_3$ and $R_5$ are each independently a substituted or unsubstituted alkyl group having 1 to 4 carbon atoms, a hydrogen atom, a hydroxyl group, a carboxyl group or a sulfonyl group. $R_4$ is a hydrogen atom, hydroxyl group, substituted or unsubstituted alkyl group having 1 to 4 carbon atoms, carboxyl group or sulfonyl group which is bonded to any carbon atom except for the nitrogen atoms and carbonyl group that constitute the five-membered ring; and n is an integer of 0 to 4.

The reason is unclear why the ink in which the branched alkanediol having hydroxyl groups at both terminals of its main chain and at least one of the compound represented by the general formula (1) and the compound represented by the general formula (2) are used in combination brings out the excellent cooperative effect in regard to the intermittent ejection stability. The present inventors presume the reason to be as stated below.

First, one of the causes of a lowering of the intermittent ejection stability of ink is that the water and so forth in the ink evaporates from ejection orifices even during a time period, a very short time period, where the ink is not ejected in a process of scanning of a recording head. That is, it is presumed that the evaporation of the water and so forth lowers the solubility or dispersion stability of the coloring material in the ink relatively to cause precipitation or solidification of the coloring material and come to stop the ejection orifices, resulting in a lowering of the intermittent ejection stability. It is also presumed that the thickening of ink that is accompanied by the evaporation of the water and so forth is also one of the causes of a lowering of the intermittent ejection stability.

As the water and so forth in the ink come to evaporate from the ejection orifices, the coloring material in the ink becomes relatively high in concentration in the vicinity of the ejection orifices, and, on the other hand, the coloring material in the ink becomes relatively low in concentration at the part distant from the ejection orifices in the interior of nozzles. Then, there comes about a difference in concentration of the coloring material between the vicinity of the ejection orifices and the interior of the nozzles. At this point of time, the solubility or dispersion stability of the coloring material lowers in the vicinity of the ejection orifices to cause precipitation or solidification of the coloring material, and this makes the ejection orifices stopped, resulting in a lowering of the intermittent ejection stability.

In contrast thereto, it is presumed that, inasmuch as the branched alkanediol having hydroxyl groups at both terminals of its main chain and at least one of the compound represented by the general formula (1) and the compound represented by the general formula (2) are used in combination, the intermittent ejection stability has been kept from lowering, by the mechanism as stated below. Stated specifically, it is presumed that, when the water and so forth have evaporated from the ejection orifices, the diffusion of coloring material that is due to the difference in concentration of the coloring material between the vicinity of the ejection orifices and the interior of the nozzles takes place earlier than the solubility or dispersion stability of the coloring material come to lower, and, as a result of this, the ink has enabled the coloring material to be kept from its precipitation or solidification in the vicinity of the ejection orifices.

Such diffusion of coloring material comes about by the mechanism as stated below. First, as a result of the evaporation of the water and so forth, the branched alkanediol having hydroxyl groups at both terminals of its main chain and at least one of the compound represented by the general formula (1) and the compound represented by the general formula (2) each become higher in concentration in the vicinity of the ejection orifices than those before the evaporation. Here, the branched alkanediol having hydroxyl groups at both terminals of its main chain acts as a bad solvent for the coloring material. Hence, in the vicinity of the ejection orifices, at which the bad solvent has become high in concentration, the coloring material is, in an attempt to maintain its dissolution stability, considered to go on to diffuse quickly to the interior of nozzles that is distant from the ejection orifices. As the result, in the vicinity of the ejection orifices, the coloring material is kept from becoming so high in concentration as to cause its precipitation or solidification, so that the ink is improved in intermittent ejection stability.

In the invention disclosed in the afore-said Japanese Patent Laid-open Application No. 2005-298813, the ink is incorporated with stated water-soluble organic solvents in specific amounts, where the evaporation of water and so forth from ejection orifices and the increase in viscosity of the ink in the interior of nozzles are controlled so that the ink can be improved in ejection stability. Also, in the invention disclosed in the afore-said Japanese Patent Laid-open Application No. 2007-39680, the properties of ink are so designed that the ink may readily gel or solidify at usual temperature and on the other hand may stand liquefied at the temperature where it is ejected, to achieve the ejection of ink that is kept good. Thus, such conventional techniques for improving the intermittent ejection stability are based on an idea that a humectant is used to keep the water and so forth from evaporating to prevent the coloring material from precipitating or solidifying, or an idea that the properties of ink are changed by temperature control. However, even with employment of these conventional techniques, what can be achieved is nothing more than an improvement in intermittent ejection stability in a limited environment as in only the environment of low temperature and low humidity or only the environment of high temperature and low humidity. Thus, it has not been succeeded to improve the intermittent ejection stability in various environments as so demanded in recent years.

From these conventional techniques, the present invention differs entirely in its technical idea. In the present invention, the effect having been not obtainable by the conventional techniques has been achieved by virtue of the novel make-up wherein the specific branched alkanediol acting as a bad solvent for the coloring material and at least one of the compound represented by the general formula (1) and the compound represented by the general formula (2) are used in combination to make the coloring material diffuse effectively.

That is, by virtue of the above novel make-up, the stability of ink and also the intermittent ejection stability have been improved, and this has achieved an improvement in the intermittent ejection stability in various environments of low temperature and low humidity, high temperature and low humidity and the like as so demanded in recent years.

Ink

Components making up the ink according to the present invention, physical properties of the ink, and so forth are described below in detail.

Branched alkanediol having hydroxyl groups at both terminals of its main chain:

The ink of the present invention is, as described above, required to contain the branched alkanediol having hydroxyl groups at both terminals of its main chain. The branched alkanediol having hydroxyl groups at both terminals of its main chain as used in the present invention may specifically include, e.g., the following. The branched alkanediol having hydroxyl groups at both terminals of its main chain as exemplified below may be used alone or in combination of two or more types.

2-Methyl-1,3-propanediol, 2-ethyl-1,3-propanediol, 2,2-dimethyl-1,3-propanediol, 2,2-diethyl-1,3-propanediol and 2-methyl-2-propyl-1,3-propanediol; 2-methyl-1,5-pentanediol, 3-methyl-1,5-pentanediol, 2,2-dimethyl-1,5-pentanediol, 2,4-dimethyl-1,5-pentanediol and 2,4-diethyl-1,5-pentanediol; 2,5-diethyl-1,6-hexanediol and 2,2,4-trimethyl-1,6-hexanediol; 2,4,6-trimethyl-1,7-heptanediol and 1,2,6-trimethyl-1,7-heptanediol; and 2-methyl-1,8-octanediol and 2,6-dimethyl-1,8-octanediol.

In the present invention, in order to more improve the intermittent ejection stability and stability of ink in the environment of low temperature and low humidity, the branched alkanediol having hydroxyl groups at both terminals of its main chain may preferably be used in the ink in a content (% by mass) set as described below. That is, it may preferably be in a content of from 1.0% by mass or more to 20.0% by mass or less, and more preferably from 1.0% by mass or more to 15.0% by mass or less, with respect to the total mass of the ink.

According to studies made by the present inventors, in order to improve more the intermittent ejection stability and stability of ink especially in the environment of low temperature and low humidity, the number of carbon atoms in the branched alkanediol having hydroxyl groups at both terminals of its main chain may preferably be 9 or less. As the lower limit, the number of carbon atoms may preferably be 4 or more. In the foregoing, the number of carbon atoms in the branched alkanediol having hydroxyl groups at both terminals of its main chain means the number of all the carbon atoms in the compound including main chain and branches.

Further, in the branched alkanediol having hydroxyl groups at both terminals of its main chain, it is preferable for its main chain to have a branch (a substituent) attached so as to be symmetric with the main chain. More specifically, where, e.g., the number of carbon atoms is an odd number, the carbon at the middle of its main chain may preferably have a branch (a substituent). As specific examples of such a branched alkanediol having hydroxyl groups at both terminals of its main chain, it may include the following. It may include, e.g., 2-methyl-1,3-propanediol, 2-ethyl-1,3-propanediol, 2,2-dimethyl-1,3-propanediol, 2,2-diethyl-1,3-propanediol, and 2-methyl-2-propyl-1,3-propanediol; and also 3-methyl-1,5-pentanediol. The branch (substituent) may also preferably be a methyl group or an ethyl group, and particularly preferably be a methyl group. In the present invention, in order to achieve excellent intermittent ejection stability and stability of ink in various environments, it is most preferable to use 3-methyl-1,5-pentanediol as the branched alkanediol having hydroxyl groups at both terminals of its main chain.

Compound represented by the general formula (1) and/or the compound represented by the general formula (2):

The ink of the present invention is, as described above, required to contain the branched alkanediol having hydroxyl groups at both terminals of its main chain and also at least one of the compound represented by the general formula (1) and the compound represented by the general formula (2).

$$R_1\text{-}[A]\text{-}R_2 \qquad \text{General Formula (1)}$$

In the general formula (1), A is —S—, —S(=O)— or —S(=O)$_2$—. $R_1$ and $R_2$ are each independently a hydrogen atom, a hydroxyl group, an alkyl group, a hydroxyalkyl group, an alkenyl group, an acyl group, a carbamoyl group, a carboxyl group or a sulfonyl group, provided that $R_1$ and $R_2$ are not simultaneously hydrogen atom(s) and/or hydroxyl group(s).

$R_1$ and $R_2$ in the general formula (1) are each independently a hydrogen atom, a hydroxyl group, an alkyl group, a hydroxyalkyl group, an alkenyl group, an acyl group, a carbamoyl group, a carboxyl group or a sulfonyl group. As the alkyl group, it may preferably be an alkyl group having 1 to 4 carbon atoms, and may specifically include methyl, ethyl, n-propyl, iso-propyl, n-butyl, sec-butyl, t-butyl and iso-butyl. The hydroxyalkyl group may include hydroxymethyl, hydroxyethyl, hydroxypropyl and hydroxybutyl. The alkenyl group may include vinyl, allyl and isopropenyl. The acyl group may include acetyl and benzoyl. The carbamoyl group may include methyl carbamoyl and dimethyl carbamoyl.

In the present invention, the wording "$R_1$ and $R_2$ are not simultaneously hydrogen atom(s) and/or hydroxyl group(s)" in the definition of the general formula (1) means the following. That is, in the general formula (1), excluded are a case in which $R_1$ and $R_2$ are both hydrogen atoms, a case in which $R_1$ and $R_2$ are both hydroxyl groups and a case in which one of $R_1$ and $R_2$ is a hydrogen atom and the other of $R_1$ and $R_2$ is a hydroxyl group.

The compound represented by the general formula (1) may specifically include the following. Sulfine, sulfinic acid, dimethylsulfine, dimethyl sulfoxide, dimethylsulfone and (2-hydroxyethyl)methylsulfone; thiodiglycol, bis(2-hydroxyethyl)sulfoxide, 1-(2-hydroxyethylthio)-2-propanol and bis(2-hydroxyethyl)sulfone.

According to studies made by the present inventors, it has been found that a better cooperative effect is brought out and the intermittent ejection stability and the stability of ink are improved when $R_1$ and $R_2$ in the general formula (1) are each independently a hydroxyalkyl group and, in particular, $R_1$ and $R_2$ are both hydroxyethyl groups. In view of this finding, among the compounds enumerated above, it is preferable to use thiodiglycol, bis(2-hydroxyethyl) sulfoxide, 1-(2-hydroxyethylthio)-2-propanol or bis(2-hydroxyethyl)sulfone.

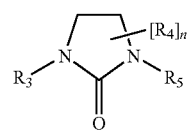

General formula (2)

In the general formula (2), $R_3$ and $R_5$ are each independently a substituted or unsubstituted alkyl group having 1 to 4 carbon atoms, a hydrogen atom, a hydroxyl group, a carboxyl group or a sulfonyl group. $R_4$ is a hydrogen atom, hydroxyl group, substituted or unsubstituted alkyl group having 1 to 4 carbon atoms, carboxyl group or sulfonyl group which is bonded to any carbon atom except for the nitrogen atoms and carbonyl group that constitute the five-membered ring; and n is an integer of 0 to 4.

$R_3$ and $R_5$ in the general formula (2) are each independently a substituted or unsubstituted alkyl group having 1 to 4 carbon atoms, a hydrogen atom, a hydroxyl group, a carboxyl group or a sulfonyl group. $R_4$ in the general formula (2) is a hydrogen atom, hydroxyl group, substituted or unsubstituted alkyl group having 1 to 4 carbon atoms, carboxyl group or sulfonyl group which is bonded to any carbon atom except for the nitrogen atoms and carbonyl group that constitute the five-membered ring. The above alkyl group may include methyl, ethyl, n-propyl, iso-propyl, n-butyl, sec-butyl, t-butyl and iso-butyl. The substituent of the alkyl group may include a methyl group, an ethyl group, a hydroxyl group, an amino group, a carboxyl group and a sulfonyl group.

The compound represented by the general formula (2) may include, as preferred examples thereof, ethylene urea, dimethylimidazolidinone (1,3-dimethyl-2-imidazolidinone) and 4,5-dibutyl-2-imidazolidinone. In particular, it has been found that a better cooperative effect is brought out and the intermittent ejection stability and the stability of ink are improved when the ethylene urea is used. From the viewpoint of ink storage stability, it is important to take the cyclic structure as in the compound represented by the general formula (2). A compound having a structure similar to the compound represented by the general formula (2) but not being the cyclic structure as exemplified by urea is, when the ink is stored, so low stable as to tend to cause, e.g., changes in pH. In the present invention, it is particularly preferable to use the compound represented by the general formula (1) and the compound represented by the general formula (2) in combination.

In the ink, the compound represented by the general formula (1) may preferably be in a content of from 1.0% by mass or more to 15.0% by mass or less with respect to the total mass of the ink. In the ink, the compound represented by the general formula (2) may also preferably be in a content of from 1.0% by mass or more to 15.0% by mass or less with respect to the total mass of the ink.

The ink may also be so designed that content A of the branched alkanediol having hydroxyl groups at both terminals of its main chain, content B of the compound represented by the general formula (1) and content C of the compound represented by the general formula (2) which are with respect to the total mass of the ink may stand the following relationship. The content A to C is in % by mass. That is, it is preferable for the content A to C to satisfy the relationship of $0.2 \leq A/(B+C) \leq 3.0$. Controlling the value of $A/(B+C)$ so as to be within the above range makes it able to obtain an ink excellent in the intermittent ejection stability and stability of ink especially in an environment of high temperature and low humidity. More preferably, the ink may be so designed as to satisfy the relationship of $0.2 \leq A/(B+C) \leq 2.0$, where an ink can be obtained which is excellent in the intermittent ejection stability in various environments while maintaining the stability of ink.

Aqueous Medium:

The ink of the present invention is, as described above, required to use the branched alkanediol having hydroxyl groups at both terminals of its main chain and at least one of the compound represented by the general formula (1) and the compound represented by the general formula (2). As long as this condition is fulfilled, the ink of the present invention may contain, besides these compounds, water or an aqueous medium containing any other water-soluble organic solvent, which is as used in commonly available ink jet inks.

As the water, it is preferable to use deionized water (ion-exchanged water). The water in the ink may preferably be in a content (% by mass) of from 50.0% by mass or more to 95.0% by mass or less with respect to the total mass of the ink.

As the water-soluble organic solvent other than the above specific compounds used in the present invention, there are no particular limitations thereon as long as it is one used in ink jet inks. Any conventionally known water-soluble organic solvent may be used. Stated specifically, usable are, e.g., the following. Any of the following water-soluble organic solvents may be used alone or in combination of two or more types.

Alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; ethers such as tetrahydrofuran and dioxane; polyalkylene glycols each having a weight average molecular weight of about 200 to 1,000 such as polyethylene glycol and polypropylene glycol; alkylene glycols whose alkylene groups have 2 to 6 carbon atoms, such as ethylene glycol, diethylene glycol, propylene glycol, butylene glycol, triethylene glycol, hexylene glycol, thiodiglycol, 1,2,6-hexanetriol, and bishydroxyethyl sulfone; alkyl ether acetates such as polyethylene glycol monomethyl ether acetate; alkyl ethers of polyhydric alcohols, such as ethylene glycol monomethyl (or monoethyl) ether, diethylene glycol methyl (or ethyl) ether and triethylene glycol monomethyl (or monoethyl) ether; polyhydric alcohols, such as trimethylol propane and trimethylol ethane; and N-methyl-2-pyrrolidone, 2-pyrrolidone, sugars, and derivatives of these. In the present invention, among these water-soluble organic solvents, it is particularly preferable to use triethylene glycol.

The water-soluble organic solvent in the ink may preferably be in a content (% by mass) of from 3.0% by mass or more to 50.0% by mass or less, and more preferably from 15.0% by mass or more to 40.0% by mass or less, with respect to the total mass of the ink. The content of this water-soluble organic solvent embraces that of the branched alkanediol having hydroxyl groups at both terminals of its main chain and a least one of the compound represented by the general formula (1) and the compound represented by the general formula (2).

Coloring Material:

The coloring material used in the ink of the present invention is a dye such as an acid dye or a direct dye, or a pigment, any of which may be used. These may be used in combination of two or more. In the present invention, the coloring material in the ink may preferably be in a content (% by mass) of from 0.1% by mass or more to 10.0% by mass or less with respect to the total mass of the ink.

Dye:

There are no particular limitations on the dye usable in the ink of the present invention. An anionic dye may preferably be used and may be either of a conventional one and a newly synthesized one, any of which may be used as long as it is a dye having appropriate color tone and color density. Examples of the dye usable in the present invention are shown below by color tones.

(Dyes for Cyan Ink)

C.I. Direct Blue: 1, 15, 22, 25, 41, 76, 77, 80, 86, 90, 98, 106, 108, 120, 158, 163, 168, 199, 226, 307, etc.; C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244, etc.

(Dyes for Magenta Ink)

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230, etc.; C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289, etc.; C.I. Food Red: 87, 92, 94, etc.; C.I. Direct Violet 107, etc.

(Dyes for Yellow Ink)

C.I. Direct Yellow: 8, 11, 12, 27, 28, 33, 39, 44, 50, 58, 85, 86, 87, 88, 89, 98, 100, 110, 132, etc.; C.I. Acid Yellow: 1, 3, 7, 11, 17, 23, 25, 29, 36, 38, 40, 42, 44, 76, 98, 99, etc.; C.I. Reactive Yellow: 2, 3, 17, 25, 37, 4, etc.; C.I. Food Yellow: 3, etc.

(Dyes for Red Ink)

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230, etc.; C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289, etc.; C.I. Reactive Red: 7, 12, 13, 15, 17, 20, 23, 24, 31, 42, 45, 46, 59, etc.; C.I. Food Red: 87, 92, 94, etc.

(Dyes for Blue Ink)

C.I. Direct Blue: 1, 15, 22, 25, 41, 76, 77, 80, 86, 90, 98, 106, 108, 120, 158, 163, 168, 199, 226, etc.; C.I. Acid Blue: 1, 7, 9, 15, 22, 23, 25, 29, 40, 43, 59, 62, 74, 78, 80, 90, 100, 102, 104, 112, 117, 127, 138, 158, 161, etc.; C.I. Reactive Blue: 4, 5, 7, 13, 14, 15, 18, 19, 21, 26, 27, 29, 32, 38, 40, 44, 100, etc.

(Dyes for Black Ink)

C.I. Direct Black: 17, 19, 22, 31, 32, 51, 62, 71, 74, 112, 113, 154, 168, 195, etc.; C.I. Acid Black: 2, 48, 51, 52, 110, 115, 156, etc.; C.I. Food Black: 1, 2, etc.

Pigment:

The pigment usable in the ink of the present invention may include carbon black and organic pigments shown below.

(Carbon Black)

The pigment used in black ink may preferably be carbon black. For example, commercially available products such as furnace black, lamp black, acetylene black and channel black may be used as the carbon black. Examples of the carbon black usable in the present invention are shown below.

RAVEN: 7000, 5750, 5250, 5000 ULTRA, 3500, 2000, 1500, 1250, 1200, 1190 ULTRA-II, 1170, and 1255 (the foregoing are available from Columbian Carbon Japan Limited); BLACK PEARLS L, REGAL: 400R, 330R and 660R, MOGUL L, MONARCH: 700, 800, 880, 900, 1000, 1100, 1300 and 1400, and VALCAN XC-72 (the foregoing are available from Cabot Corp.); COLOR BLACK: FW1, FW2, FW2V, FW18, FW200, S150, S160 and S170, PRINTEX: 35, U, V, 140U and 140V, SPECIAL BLACK: 6, 5, 4A and 4, (the foregoing are available from Degussa Corp.); and No. 25, No. 33, No. 40, No. 47, No. 52, No. 900, No. 2300, MCF-88, MA600, MA7, MA8, and MA100 (the foregoing are available from Mitsubishi Chemicals, Inc.).

Carbon black prepared newly may also be used. Of course, in the present invention, examples are by no means limited to these, and any conventionally known carbon black may be used. Fine magnetic-material particles of magnetite, ferrite or the like, and titanium black may also be used as black pigments.

(Organic Pigment)

Pigments used in color inks may preferably be organic pigments of various types. Examples of organic pigments usable in the present invention are shown below.

Water-insoluble azo pigments such as Toluidine Red, Toluidine maroon, Hanza Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthrone and Thioindigo maroon; phthalocyanine type pigments such as Phthalocyanine Blue and Phthalocyanine Green; quinacridone type pigments such as Quinacridone Red and Quinacridone Magenta; perylene type pigments such as Perylene Red and Perylene Scarlet; isoindolinone type pigments such as Isoindolinone Yellow and Isoindolinone Orange; imidazolone type pigments such as Benzimidazolone Yellow, Benzimidazolone Orange and Benzimidazolone Red; pyranthrone type pigments such as Pyranthrone Red and Pyranthrone Orange; indigo type pigments; condensation azo type pigments; thioindigo type pigments; diketopyrrolopyrrole type pigments; and other pigments such as Flavanthrone Yellow, Acyl Amide Yellow, Quinophthalone Yellow, Nickel Azo Yellow, Copper Azomethine Yellow, Perinone Orange, Anthrone Orange, Dianthraquinonyl Red, and Dioxazine Violet.

When the organic pigments usable in the present invention are shown by Color Index (C.I.) Number, they may include, e.g., the following.

C.I. Pigment Yellow: 12, 13, 14, 17, 20, 24, 74, 83, 86, 93, 97, 109, 110, 117, 120, 125, 128, 137, 138, 147, 148, 150, 151, 153, 154, 166, 168, 180, 185, etc.; C.I. Pigment Orange: 16, 36, 43, 51, 55, 59, 61, 71, etc.; C.I. Pigment Red: 9, 48, 49, 52, 53, 57, 97, 122, 123, 149, 168, 175, 176, 177, 180, 192, etc., as well as 215, 216, 217, 220, 223, 224, 226, 227, 228, 238, 240, 254, 255, 272, etc.; C.I. Pigment Violet: 19, 23, 29, 30, 37, 40, 50, etc.; C.I. Pigment Blue: 15, 15:1, 15:3, 15:4, 15:6, 22, 60, 64, etc.; C.I. Pigment Green: 7, 36, etc.; and C.I. Pigment Brown: 23, 25, 26, etc.

Dispersing Agent:

In the case when the pigment such as the carbon black or the organic pigment is used as the coloring material, a surfactant or a resin (a high polymer) may be used as a dispersing agent in order to disperse the pigment stably in the aqueous medium. Where the resin is used as a high-polymer dispersing agent, the resin may preferably be one having a weight average molecular weight of from 1,000 or more to 30,000 or less, and more preferably from 3,000 or more to 15,000 or less. The resin may also preferably be one having an acid value of from 30 mgKOH/g or more to 400 mgKOH/g or less, and more preferably from 50 mgKOH/g or more to 250 mgKOH/g or less.

In the present invention, the dispersing agent may preferably be one which has an ionic group, and, by the action thereof, can stably disperse the carbon black or organic pigment in the aqueous medium. As the dispersing agent, any of the following may be used.

A styrene-acrylic acid copolymer, styrene-acrylic acid-alkyl acrylate copolymers, a styrene-maleic acid copolymer, styrene-maleic acid-alkyl acrylate copolymers, a styrene-methacrylic acid copolymer, styrene-methacrylic acid-alkyl acrylate copolymers, a styrene-maleic half ester copolymer, a vinyl naphthalene-acrylic acid copolymer, a vinyl naphthalene-maleic acid copolymer and a styrene-maleic anhydride-maleic half ester copolymer, or salts of these.

Self-Dispersion Pigment:

In the case when the pigment such as the carbon black or the organic pigment is used as the coloring material, an ionic group such as an anionic group may be bonded to the surfaces of pigment particles. This enables use of what is called a self-dispersion pigment, which can disperse the particles in an aqueous medium without use of any dispersing agent.

Other Additives:

To the ink of the present invention, the following various additives may optionally be added besides the above components for the purpose of, e.g., making the ink have the desired values of physical properties. For example, the ink may be incorporated with a surfactant, a pH adjuster, an antifoaming agent, a rust preventive, an antiseptic agent, a mildew-proofing agent, an antioxidant, a reduction-preventive agent, an evaporation accelerator, a chelating agent and a water-soluble polymer.

Where a surfactant is used as the additive, usable are, e.g., an anionic or nonionic surfactant. As specific examples of the anionic surfactant, it may include fatty acid salts, higher alcohol sulfuric ester salts, liquid fatty oil sulfuric ester salts and alkylallyl sulfonates. As specific examples of the nonionic surfactant, it may include polyoxyethylene alkyl ethers, polyoxyethylene alkyl esters, polyoxyethylene sorbitan alkyl esters, acetylene alcohol, and acetylene glycol. Any of these surfactants may be used alone or in combination of two or more types. In particular, in the present invention, among the foregoing, acetylene alcohols and acetylene glycols may preferably be used as surfactants because they can bring out a superior effect on the penetrability into recording mediums such as plain paper. The surfactant in the ink may preferably be in a content of from 0.01% by mass or more to 5.0% by mass or less with respect to the total mass of the ink, which content may differ depending on the type of the surfactant.

Physical Properties of Ink:

The ink of the present invention may preferably have a surface tension of 10 mN/m or more, and more preferably from 20 mN/m or more to 60 mN/m or less, at 25° C. Controlling the surface tension within the above range enables the ink of the present invention to effectively keep print twists (deviation of ink-droplet impact points) from occurring because of the wetting of ejection orifices and the vicinity thereof when used in ink jet recording. The surface tension of the ink may be controlled by appropriately determining the content of the surfactant in the ink as above. The ink of the present invention may also preferably be controlled to have the desired viscosity and pH so as to achieve a good ejection performance when used in the ink jet recording apparatus.

Ink Jet Recording Method

The ink of the present invention may particularly preferably be used in an ink jet recording method in which the ink is ejected by ink jet recording. The ink jet recording method includes a recording method in which mechanical energy is made to act on an ink to eject the ink, and a recording method in which thermal energy is made to act on an ink to eject the ink. Of these, the ink of the present invention may particularly preferably be used in the ink jet recording method that utilizes thermal energy.

Ink Cartridge

An ink cartridge suited to perform recording by using the ink of the present invention may include an ink cartridge having an ink storage portion which holds therein such an ink.

FIG. 1 is a schematic illustration of the ink cartridge. In what is shown in FIG. 1, the ink cartridge communicates with the atmosphere at its upper part through an atmosphere communication opening 112, and communicates with an ink feed opening 114 at its lower part. Then, the ink cartridge has a structure in which i) a negative-pressure generation member holding chamber 134 which holds a negative-pressure generation member in its interior and ii) a liquid-holding chamber 136 kept substantially tightly closed which holds therein a liquid ink are partitioned with a partition wall 138. The negative-pressure generation member holding chamber 134 and the liquid-holding chamber 136 are made to communicate with each other only through a communicating hole 140 formed in the partition wall 138 in the vicinity of the bottom of the ink cartridge and an air lead-in path (atmosphere lead-in path) 150 for helping the air to be readily led in the liquid-holding chamber at the time of liquid-feeding operation.

At the top wall of the ink cartridge at its part where the negative-pressure generation member holding chamber 134 is formed, a plurality of ribs are integrally formed in such a form that they protrude inward, and come into contact with the negative-pressure generation member stored in the negative-pressure generation member holding chamber 134 in a compressed state. In virtue of the ribs, an air buffer chamber is formed between the top wall and the upper surface of the negative-pressure generation member. Also, an ink feed barrel having the ink feed opening 114 is provided with a pressure contact member 146 having a higher capillary force and a stronger physical strength than the negative-pressure generation member, and is kept in pressure contact with the negative-pressure generation member.

The negative-pressure generation member holding chamber 134 holds therein as the negative-pressure generation member two capillary force generation type negative-pressure generation members, i.e., a first negative-pressure generation member 132B and a second negative-pressure generation member 132A which are formed of fibers of an olefin type resin such as polyethylene. Reference numeral 132C denotes a boundary layer of these two negative-pressure generation members, and the part where the boundary layer 132C and the partition wall 138 cross is present at an upper part than the top end of the air lead-in path (atmosphere lead-in path) 150 in a posture kept when the ink cartridge is in use with its communicating part down. Also, the ink stored in the negative-pressure generation member is present up to an upper part than the boundary layer 132C as shown by a liquid level L of the ink.

Here, the boundary layer between the first negative-pressure generation member 132B and the second negative-pressure generation member 132A is kept in pressure contact with these members, and the boundary layer has, in the vicinity of these negative-pressure generation members, a higher compressibility than the other portions to come into a state that it has a strong capillary force. More specifically, where the capillary force the first negative-pressure generation member 132B has is represented by P1, the capillary force the second negative-pressure generation member 132A has by P2, and the capillary force these negative-pressure generation members have each other at their interfaces by PS, it stands P2<P1<PS.

Figure 2:
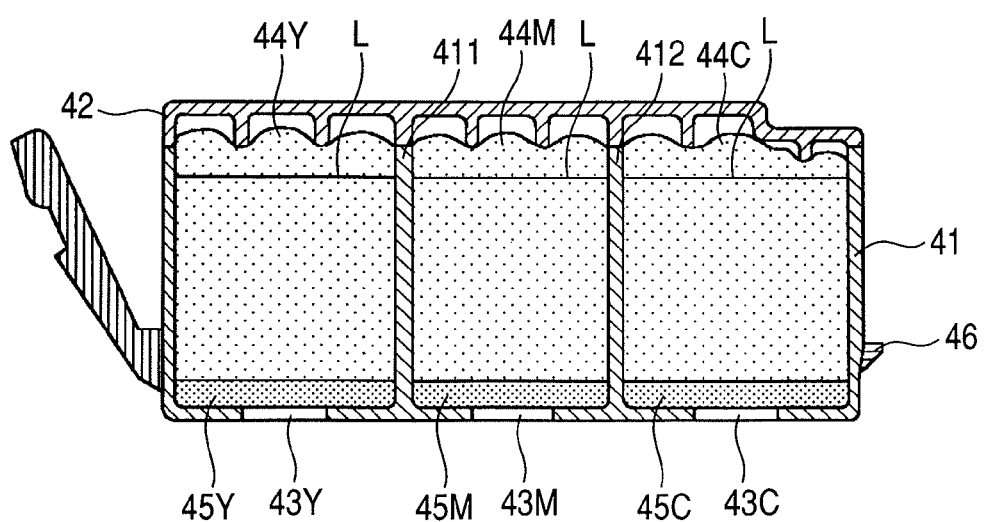
FIG. 2 is a schematic illustration of an ink cartridge.

FIG. 2 is a schematic illustration of another embodiment of the ink cartridge. The ink cartridge embodied as shown in FIG. 2 has a container 41 which holds therein inks of yellow (Y), magenta (M) and cyan (C) three colors and a cover member 42 which covers the container 41. The ink cartridge has a yellow ink feed opening 43Y, a magenta ink feed opening 43M and a cyan ink feed opening 43C, which are for a yellow ink, a magenta ink and a cyan ink, respectively. The interior of the container 41 is, in order to hold therein the inks of three colors, partitioned with two partition walls 411 and 412 provided in parallel to each other, into three spaces having volumes substantially equal to one another. These three spaces are one another arranged in the direction where the ink cartridge is to be inserted when the ink cartridge is fitted to an ink cartridge holder. In these spaces, an ink absorber 44Y which absorbs and retains the yellow ink therein, an ink absorber 44M which absorbs and retains the magenta ink therein and an ink absorber 44C which absorbs and retains the cyan ink therein are respectively received. Ink feed members 45Y, 45M and 45C which feed the respective inks through the ink feed openings are also respectively received therein in contact with the bottoms of the ink absorbers. The inks retained in the ink absorbers 44Y, 44M and 44C, which are negative-pressure generation members, are present up to each upper part of the ink absorbers as shown by a liquid level L of the ink.

Figure 3:
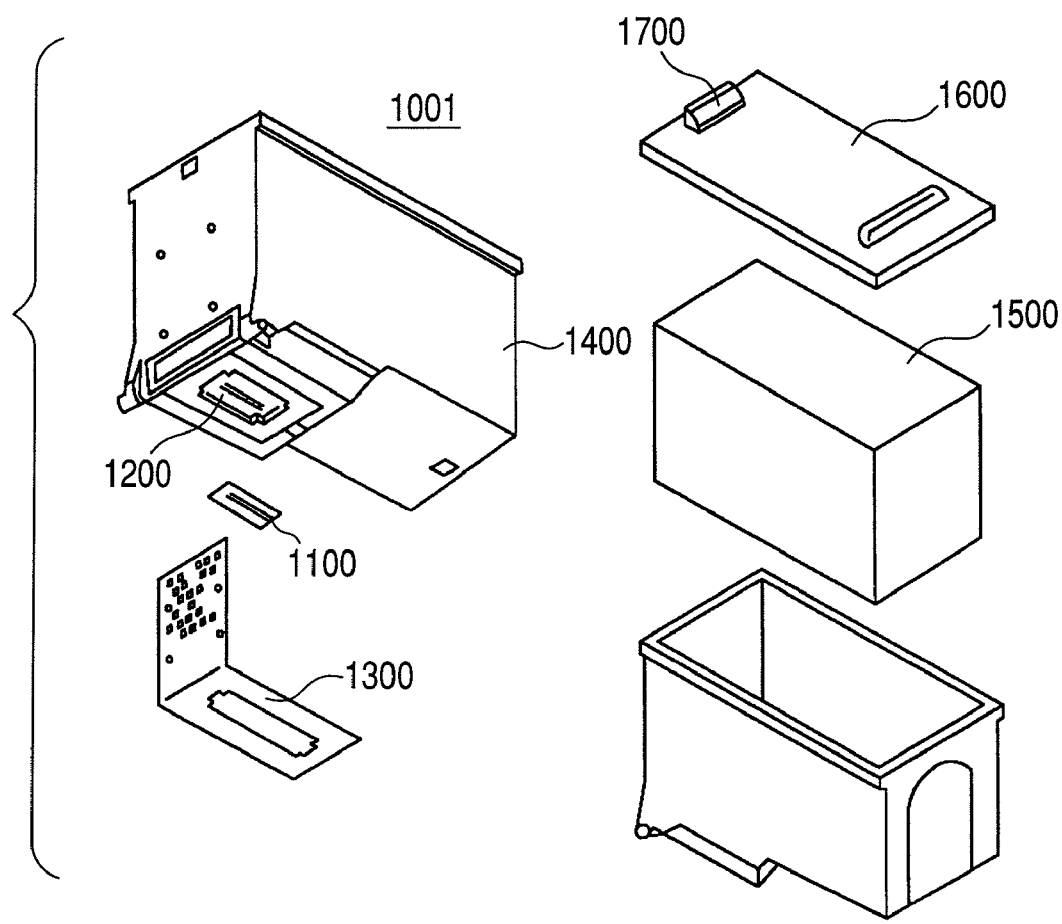
FIG. 3 is an exploded view of a recording head.

FIG. 3 is an exploded view of a recording head in which a recording head and an ink cartridge are integrally set up.

A recording head 1001 as shown in FIG. 3 is supported and fastened by a registration means and electrical contacts of a carriage placed in an ink jet recording apparatus. The recording head 1001 is also set detachably mountable to the carriage, and is changed for new one when an ink stored in the ink cartridge has been used up.

The recording head 1001 is a head for ejecting the ink therefrom, and has a recording element board 1100 where ink feed openings are formed in parallel and an electric-wiring tape 1300 which forms electric-signal paths through which electric signals for ejecting the ink are to be applied. Further, its interior is made up of an ink feed and retaining member 1400 formed by resin molding, an ink absorber 1500 which produces negative pressure for retaining the ink and a cover member 1600.

The ink feed and retaining member 1400 has the function of an ink cartridge and the function of ink feeding. More specifically, it has a space for holding therein the ink absorber 1500 which produces negative pressure for retaining the ink in its interior, thus it has the function of an ink cartridge. Further, ink channels for introducing the ink to the ink feed openings of the recording element board 1100 are formed, thus it has the function of ink feeding. At the downstream portion of the ink channels, an ink feed opening 1200 is formed which is to feed the ink to the recording element board 1100. Then, the recording element board 1100 is so fastened to the ink feed and retaining member 1400 that the ink feed openings of the recording element board 1100 may communicate with the ink feed opening 1200 of the ink feed and retaining member 1400. The electric-wiring tape 1300 is also fastened at its some part on the back surface thereof to a plane surrounding the ink feed opening 1200. The cover member 1600 is fused to the ink feed and retaining member 1400 at its upper opening so as to close the space of the interior of the ink feed and retaining member 1400. The cover member 1600 has a connector 1700 for fastening the recording head 1001 to an ink jet recording apparatus.

Figure 4:
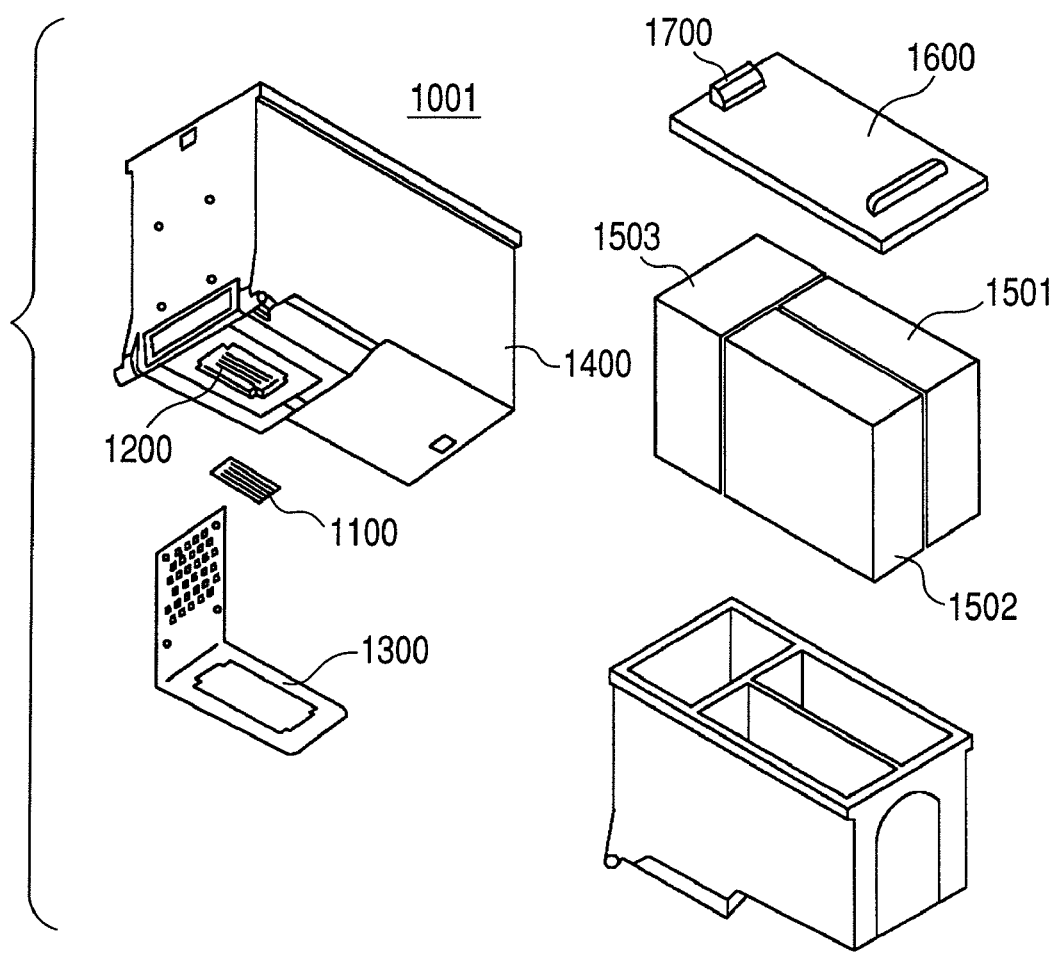
FIG. 4 is an exploded view of a recording head.

FIG. 4 is an exploded view of a recording head which is another example of what is usable in the present invention. The recording head shown in FIG. 4 is, like that shown in FIG. 3, set up integrally with the ink cartridge. A recording head 1001 can hold a plurality of inks of different colors (e.g., a cyan ink, a magenta ink and a yellow ink), and is changed for new one when the inks stored in the ink cartridge have been used up.

Where such a recording head is used, an ink cartridge may preferably be used in which the levels where inks making up an ink set evaporate from respective ink chambers are substantially equal to one another. What is meant by "the levels where inks making up an ink set evaporate from respective ink chambers are substantially equal to one another" is that, when, e.g., the respective ink chambers are made to contain water and the rates of evaporation from the ink chambers are measured, the difference in evaporation rate is about 1% or less.

The recording head 1001 is a head for ejecting therefrom a plurality of inks of different colors (e.g., a cyan ink, a magenta ink and a yellow ink), and is made up of substantially the same members as those denoted by like reference numerals in FIG. 3, except for a recording element board 1100 where ink feed openings for the cyan, magenta and yellow inks are formed in parallel. In the recording element board 1100, lines of recording elements (hereinafter also "nozzle line(s)") are formed which respectively correspond to the different inks. In the present invention, from the viewpoint of high image quality, preferred are nozzles for ejecting small-droplet inks of 5 pL or less, and more preferably 2 pL or less, in ejection volume. Ejection orifices may each preferably be less than 10 μm in diameter. From the viewpoint of achievement of both high image quality and high-speed recording, it is also preferable to use different kinds of nozzles (e.g., those of 5 pL, 2 pL and 1 pL) in combination in order to eject inks with different kinds of ejection volume.

The ink feed and retaining member 1400 has the function of an ink cartridge and the function of ink feeding. More specifically, it has a space for holding therein ink absorbers 1501, 1502 and 1503 which produce negative pressure for retaining the cyan ink, the magenta ink and the yellow ink, respectively, independently in its interior, thus it has the function of an ink cartridge. Further, independent ink channels for introducing the respective inks to the ink feed openings of the recording element board 1100 are formed, thus it has the function of ink feeding.

Recording Unit

A recording unit suited to perform recording by using the ink of the present invention may include a recording unit having i) an ink storage portion holding such an ink therein and ii) a recording head for ejecting the ink therefrom. In particular, a recording unit may preferably be used in which the recording head ejects an ink by acting thermal energy on the ink in accordance with recording signals. In particular, in the present invention, it is preferable to use a recording head having a heat-generating part liquid-contacting surface layer which contains a metal and/or a metal oxide. The metal and/or a metal oxide making up the heat-generating part liquid-contacting surface layer may specifically include, e.g., metals such as Ta, Zr, Ti, Ni and Al, and oxides of these metals.

Ink Jet Recording Apparatus

The ink jet recording apparatus suited to perform recording by using the ink of the present invention may include an ink jet recording apparatus having i) an ink storage portion holding such an ink therein and ii) a recording head for ejecting the ink therefrom. In particular, an ink jet recording apparatus may preferably be used in which the recording head ejects an ink by acting thermal energy on the ink in accordance with recording signals; the ink being in the interior of a recording head having an ink storage portion holding the ink therein.

Outline construction of the working part of an ink jet recording apparatus is described below. The ink jet recording apparatus is, from function of each mechanism, constituted of a sheet feed part, a sheet transport part, a carriage part, a sheet delivery part, a cleaning part, and an exterior housing which protects these and provides design quality.

Figure 5:
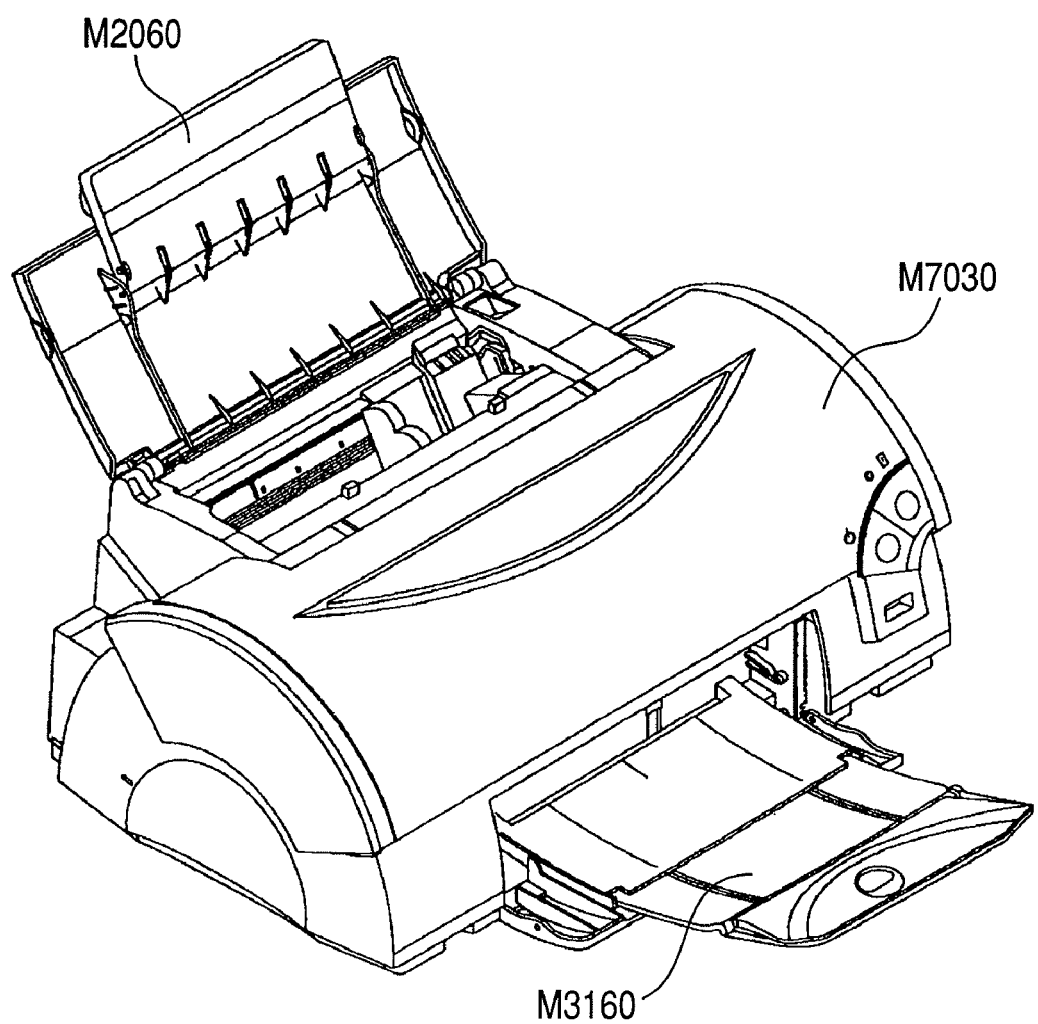
FIG. 5 is a perspective view of an ink jet recording apparatus.
Figure 6:
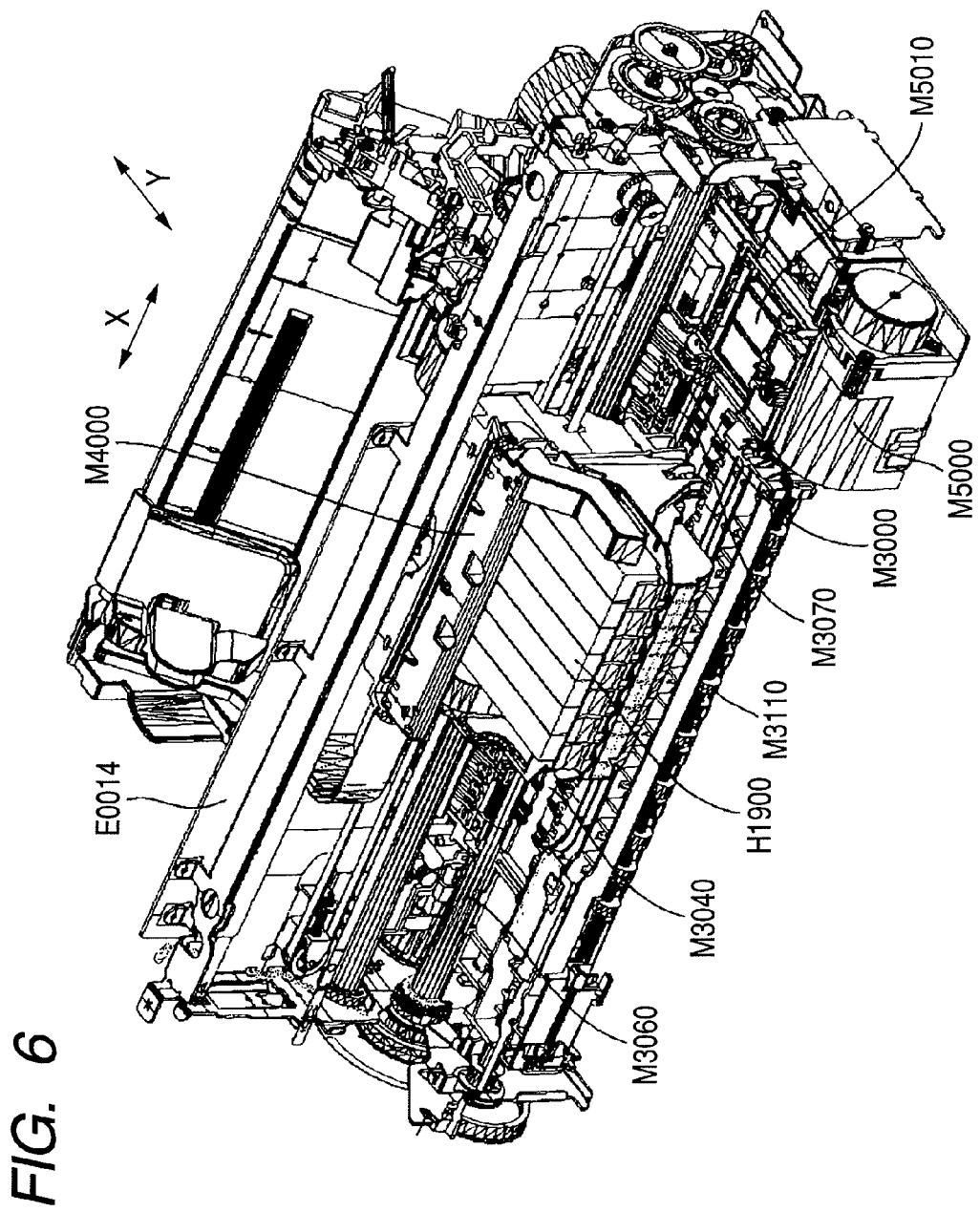
FIG. 6 is a perspective view of the working part of the ink jet recording apparatus.
Figure 7:
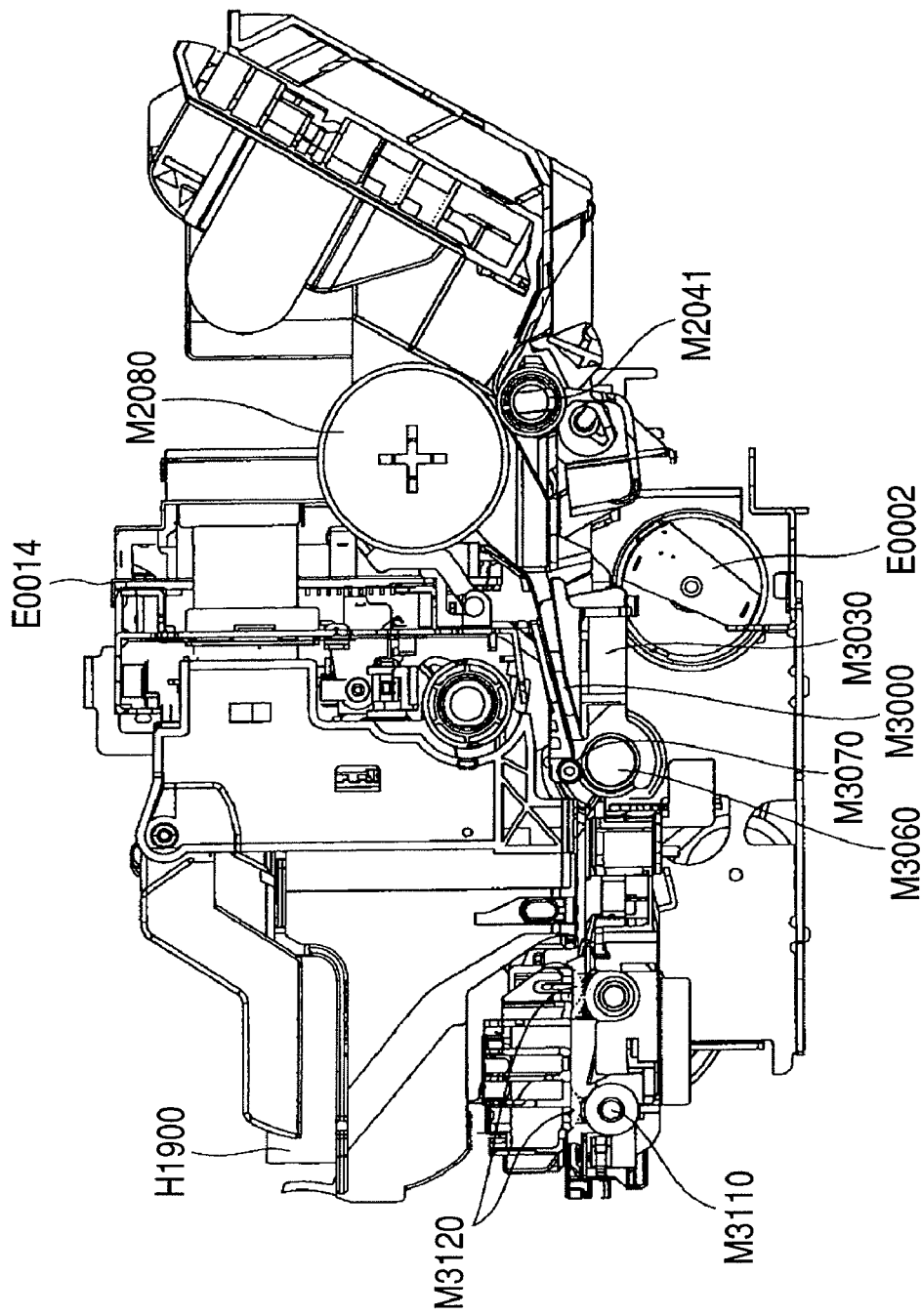
FIG. 7 is a sectional view of the ink jet recording apparatus.

FIG. 5 is a perspective view of the ink jet recording apparatus. FIGS. 6 and 7 are views to illustrate the internal mechanism of the ink jet recording apparatus. FIGS. 6 and 7 are a perspective view as viewed from the upper right and a sectional side view, respectively, of the ink jet recording apparatus.

When recording sheets are fed in the recording apparatus, in the sheet feed part, having a sheet feed tray M2060, only a stated number of sheets of recording mediums are sent to a nip zone formed by a sheet feed roller M2080 and a separation roller M2041 (see FIGS. 5 and 7). The recording mediums thus sent are separated at the nip zone, and only the uppermost-positioned recording medium is transported. The recording medium sent to the sheet transport part is guided by a pinch roller holder M3000 and a sheet guide flapper M3030, and is sent to a pair of rollers, a transport roller M3060 and a pinch roller M3070. The pair of rollers consisting of the transport roller M3060 and the pinch roller M3070 is rotated by the drive of an LF motor E0002, and the recording medium is transported over a platen M3040 by this rotation (see FIGS. 6 and 7).

In the carriage part, when images are formed on the recording medium, a recording head H1001 (see FIG. 8; details of construction are described later) is set at the intended image forming position, and ejects inks against the recording medium in accordance with signals sent form an electric board E0014. Recording is performed by the recording head H1001, during which it alternately repeats the primary scanning in which a carriage M4000 is scanned in the column direction and the secondary scanning in which the transport roller M3060 transports the recording medium in the row direction, whereby images are formed on the recording medium. The recording medium on which the images have been formed is inserted to a nip between a first sheet delivery roller M3110 and a spur M3120 at the sheet delivery part, in the state of which it is transported therethrough, and is delivered to a sheet delivery tray M3160.

The cleaning part cleans the recording head H1001 before and after the images are formed. A pump M5000 is operated in the state a cap M5010 is brought into contact with ink ejection orifices of the recording head H1001, whereupon unwanted inks and so forth are sucked up from the ink ejection orifices of the recording head H1001. It is also so designed that, in the state the cap M5010 is opened, the inks remaining in the cap M5010 are sucked up so that sticking of inks and any other difficulties caused by the remaining inks may not occur.

(Recording Head Construction)

Figure 8:
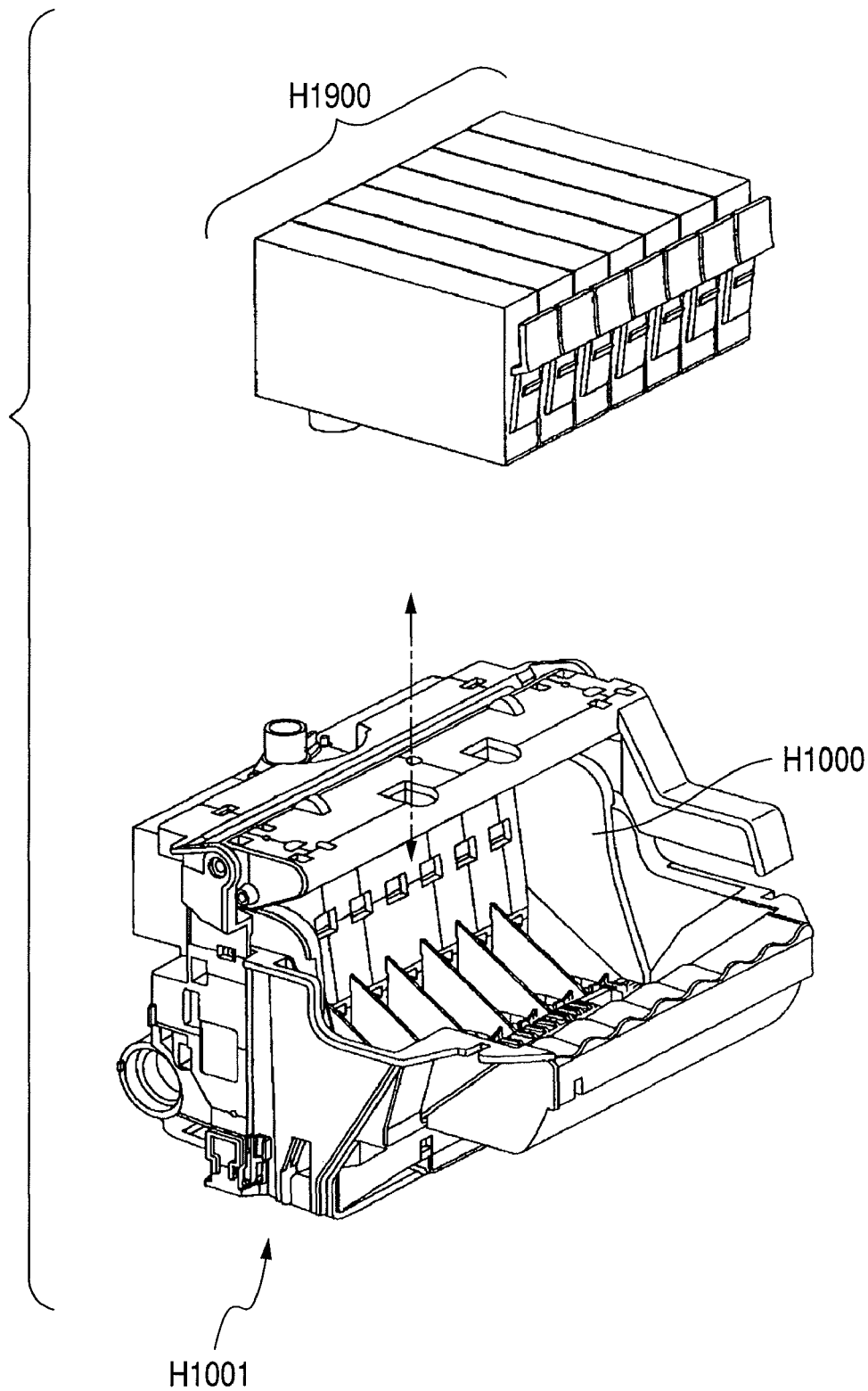
FIG. 8 is a perspective view showing how ink cartridges are attached to a head cartridge.

How a head cartridge H1000 is constructed is described (see FIG. 8). The head cartridge H1000 has the recording head H1001, a means for mounting ink cartridges denoted collectively as H1900, and a means for feeding inks from the ink cartridges H1900 to the recording head, and is detachably mounted to the carriage M4000 (see FIG. 6).

FIG. 8 illustrates how the ink cartridges H1900 are attached to the head cartridge H1000. The ink jet recording apparatus forms images using, e.g., yellow, magenta, cyan, black, light magenta, light cyan and green inks. Accordingly, the ink cartridges H1900 as well are independently readied for seven colors. In the foregoing, the ink of the present invention is used in at least one ink. Then, as shown in FIG. 8, each ink cartridge is set detachably to the head cartridge H1000. Here, the ink cartridges H1900 may be attached or detached in the state the head cartridge H1000 is mounted to the carriage M4000.

Figure 9:
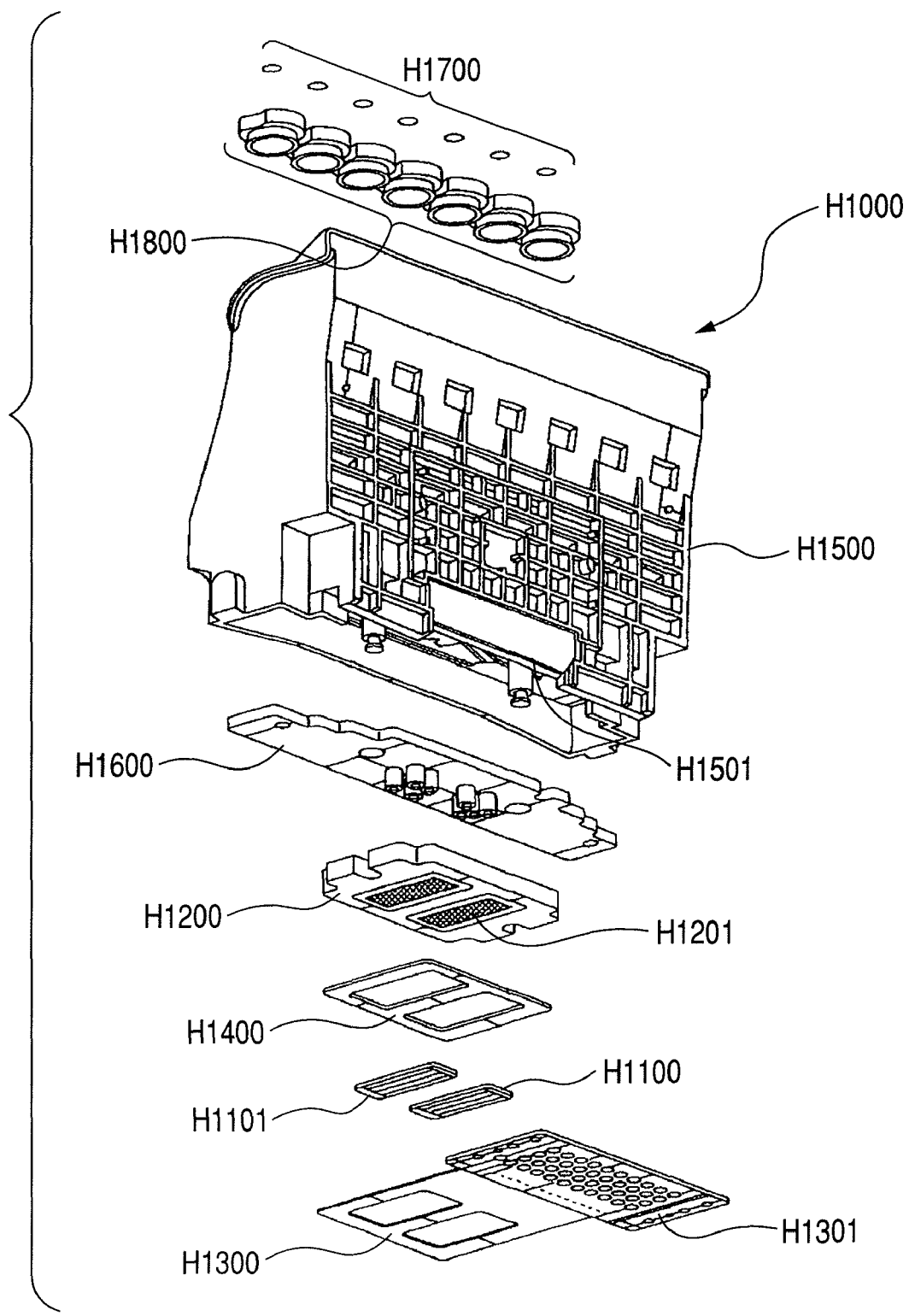
FIG. 9 is an exploded perspective view of the head cartridge.

FIG. 9 is an exploded perspective view of the head cartridge H1000. The head cartridge H1000 is constituted of a recording element board, a plate, an electric wiring circuit board H1300, an ink cartridge holder H1500, an ink channel forming member H1600, filters H1700, seal rubbers H1800 and so forth. The recording element board is constituted of a first recording element board H1100 and a second recording element board H1101. The plate is constituted of a first plate H1200 and a second plate H1400.

The first recording element board H1100 and the second recording element board H1101 are each a silicon board, on one side of which a plurality of recording elements (nozzles) for ejecting inks therefrom have been formed by photolithography. Al or the like electric wiring through which electric power is supplied to each recording element is formed by a film-forming technique. A plurality of ink channels corresponding to the individual recording elements are also formed by photolithography. Further, ink feed openings for feeding inks to the plurality of ink channels are so formed that they open on the back.

Figure 10:
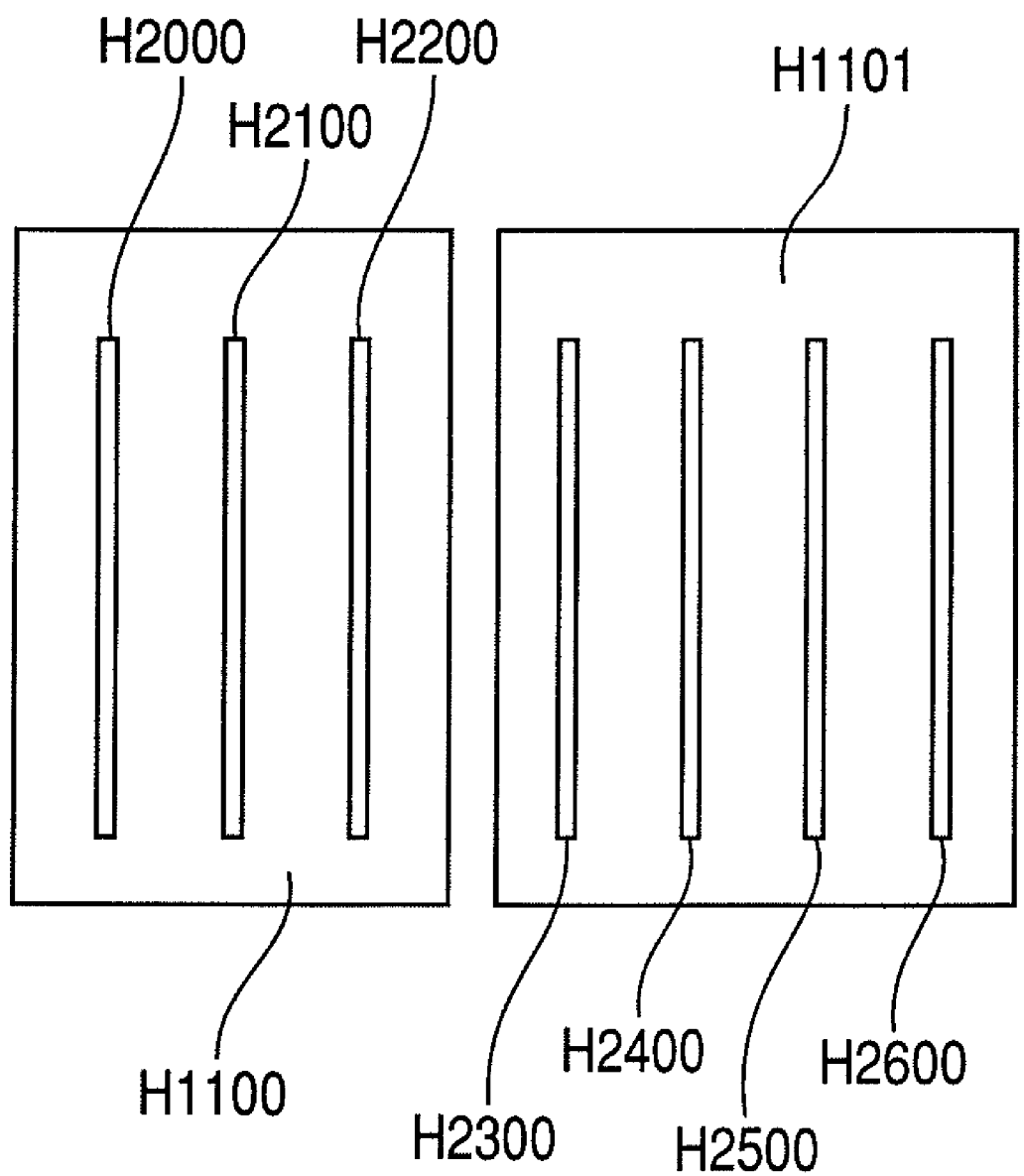
FIG. 10 is a front view showing a recording element board in the head cartridge.

FIG. 10 is an enlarged front view to illustrate the construction of the first recording element board H1100 and second recording element board H1101. Reference numerals H2000 to H2600 denote lines of recording elements (hereinafter also "nozzle line(s)") which respectively correspond to different ink colors. In the first recording element board H1100, nozzle lines for three colors are formed which are a yellow ink nozzle line H2000, a magenta ink nozzle line H2100 and a cyan ink nozzle line H2200. In the second recording element board H1101, nozzle lines for four colors are formed which are a light-cyan ink nozzle line H2300, a black ink nozzle line H2400, a green ink nozzle line H2500 and a light-magenta ink nozzle line H2600.

Each nozzle line is constituted of 768 nozzles arranged at intervals of 1,200 dpi (dot per inch; a reference value) in the direction of transport (secondary scanning direction) of the recording medium, and ejects about 2 picoliters of ink. Opening area of each ejection orifice is set to be about 100 µm². Diameter of the opening is set to be about 6 µm. In the present invention, from the viewpoint of achieving a high image quality, preferred are nozzles for ejecting small-droplet inks of 5 pL or less, and more preferably 2 pL or less, in ejection volume. Ejection orifices may each preferably be less than 10 µm in diameter. From the viewpoint of achievement of both high image quality and high-speed recording, it is also preferable to use different kinds of nozzles (e.g., those of 5 pL, 2 pL and 1 pL) in combination in order to eject inks with different kinds of ejection volume.

The head cartridge H1000 is described below with reference to FIGS. 8 and 9. The first recording element board H1100 and the second recording element board H1101 are fastened to the first plate H1200 by bonding. In this plate, an ink feed opening H1201 is formed through which the ink is to be fed to the first recording element board H1100 and second recording element board H1101. The second plate H1400, having openings, is further fastened to the first plate H1200 by bonding. This second plate H1400 holds the electric wiring circuit board H1300 so that the electric wiring circuit board H1300 may electrically be connected with the first recording element board H1100 and second recording element board H1101.

The electric wiring circuit board H1300 applies electric signals for ejecting the inks from the respective nozzles formed in the first recording element board H1100 and second recording element board H1101. This electric wiring circuit board H1300 has electric wiring corresponding to the first recording element board H1100 and second recording element board H1101, and an external signal input terminal H1301 which is positioned at an end portion of this electric wiring and through which the electric signals from the ink jet recording apparatus are to be received. The external signal input terminal H1301 is fastened under registration to the ink cartridge holder H1500 on its back side.

To the ink cartridge holder H1500, which holds the ink cartridges H1900, the channel forming member H1600 is fastened by, e.g., ultrasonic welding to form ink channels H1501 which lead from the ink cartridges H1900 to the first plate H1200. At ink cartridge side end portions of the ink channels H1501 engaging with the ink cartridges H1900, the filters H1700 are provided so that any dust and dirt can be prevented from coming in from the outside. The seal rubbers H1800 are also fitted at the part where the ink channels H1501 engage with the ink cartridges H1900 so that the inks can be prevented from evaporating through the part of engagement.

Further, as described above, the ink cartridge holder part is joined to the recording head H1001 by bonding or the like to set up the head cartridge H1000. The ink cartridge holder part is constituted of the ink cartridge holder H1500, the channel forming member H1600, the filters H1700 and the seal rubbers H1800. The recording head H1001 is constituted of the first recording element board H1100, the second recording element board H1101, the first plate H1200, the electric wiring circuit board H1300 and the second plate H1400.

Here, as a form of the recording head, a recording head of a thermal ink jet recording system has been described in which recording is performed using an electrothermal transducer (a recording element) which produces thermal energy for causing film bubbling corresponding to electric signals. As to typical construction and principles of such a recording system, preferred is what is performed by the use of basic principles disclosed in, e.g., U.S. Pat. No. 4,723,129 and U.S. Pat. No. 4,740,796. This system is applicable to any of what are called an on-demand type and a continuous type.

It is especially effective for the thermal ink jet recording system to be used in the on-demand type. In the case of the on-demand type, at least one drive signal corresponding to recording information and giving rapid temperature rise that exceeds nucleate boiling is applied to an electrothermal transducer disposed correspondingly to fluid channels holding the ink therethrough. This generates thermal energy in the electrothermal transducer to cause film boiling in the ink, and consequently bubbles in ink can be formed one to one correspondingly to this drive signal. The growth and shrinkage of such bubbles cause the ink to be ejected through ejection orifices to form at least one ink droplet. Where this drive signal is applied in a pulse form, the growth and shrinkage of the bubbles take place instantly and appropriately, and hence the ejection of ink in an especially good response can be achieved, as being more preferable.

Without limitation to the above thermal ink jet recording system, the ink of the present invention may preferably be used also in an ink jet recording apparatus that utilizes mechanical energy, which is as described below. The ink jet recording apparatus of such a form has a nozzle-formed board having a plurality of nozzles, a pressure generating element composed of a piezoelectric material and a conductive material, provided opposingly to the nozzles, and an ink with which the surrounding of the pressure generating element is filled. Then, the pressure generating element is made to undergo displacement by an applied voltage to eject the ink from the nozzles.

The ink jet recording apparatus that may be used is not limited to the one in which the recording head and the ink cartridges are separately set up, and may also be one making use of them set integral unseparably, as described above. Further, the ink cartridges may be those which are separable from or integral with a head and mounted to a carriage, or those which are provided at a stationary portion of the ink jet recording apparatus and feed inks to a recording head through an ink feeding member such as tubes. Where an ink cartridge is provided with a structure for causing negative pressure to act on a recording head, it may be set up in the following way. That is, it may take a form in which an absorber is disposed in an ink storage portion of the ink cartridge, or a form in which the ink cartridge has a flexible ink holding bag and a spring member which makes a pressing force act on the bag in the direction where its internal volume is expanded. Instead, the recording apparatus may employ a serial type recording system like that described above, but also may take a form of a line printer in which recording elements are arrayed over the range corresponding to the whole width of a recording medium.

EXAMPLES

The present invention is described below in greater detail by giving Examples and Comparative Examples. The present invention is by no means limited by the following Examples unless it is beyond its gist. In the following, what is shown by "%" is by mass unless particularly noted.

Preparation of Inks

The components shown in Table 1 below were mixed and thoroughly stirred to effect dissolution, followed by pressure filtration using a microfilter of 0.2 μm in pore size (available from Fuji Photo Film Co., Ltd.) to prepare inks. The lower columns of each of Tables 1 below show the main characteristics of inks.

TABLE 1

Ink composition and main characteristics of inks (units of ink components: %)

| | Example | | | | | | |
|---|---|---|---|---|---|---|---|
| | 1 | 2 | 3 | 4 | 5 | 6 | 7 |
| C.I. Acid Red 289 | 6.0 | 6.0 | 6.0 | 6.0 | 6.0 | 6.0 | 6.0 |
| C.I. Direct Blue 199 | | | | | | | |
| C.I. Direct Yellow 132 | | | | | | | |
| 3-Methyl-1,5-pentanediol | 10.0 | 10.0 | | | | 10.0 | 10.0 |
| 2-Methyl-1,3-propanediol | | | | 10.0 | | | |
| 2,4-Diethyl-1,5-pentanediol | | | | | 3.0 | | |
| 1,2,6-Trimethyl-1,7-heptanediol | | | 3.0 | | | | |
| Bis(2-hydroxyethyl) sulfone | | | 10.0 | 5.0 | 10.0 | 10.0 | |
| Dimethyl sulfoxide | 10.0 | | | | | | |
| Ethylene urea | | | 10.0 | 5.0 | 10.0 | | 10.0 |
| Dimethyl-imidazolidinone | | 10.0 | | | | | |
| Triethylene glycol | | | | | | | |
| 1,2-Hexanediol | | | | | | | |
| 1,5-Pentanediol | | | | | | | |
| ACETYLENOL EH (*1) | 0.6 | 0.6 | 0.6 | 0.6 | 0.6 | 0.6 | 0.6 |
| Pure water | 73.4 | 73.4 | 70.4 | 73.4 | 70.4 | 73.4 | 73.4 |
| Characteristics: | | | | | | | |
| Content A of branched alkanediol having hydroxyl groups at both terminals of its main chain (% by mass) | 10.0 | 10.0 | 3.0 | 10.0 | 3.0 | 10.0 | 10.0 |
| Content B of compound represented by the general formula (1) (% by mass) | 10.0 | 0.0 | 10.0 | 5.0 | 10.0 | 10.0 | 0.0 |
| Content C of compound represented by the general formula (2) (% by mass) | 0.0 | 10.0 | 10.0 | 5.0 | 10.0 | 0.0 | 10.0 |
| Value of A/(B + C) | 1.00 | 1.00 | 0.15 | 1.00 | 0.15 | 1.00 | 1.00 |

TABLE 1-continued

Ink composition and main characteristics of inks (units of ink components: %)

|  | Example | | | | | |
|---|---|---|---|---|---|---|
|  | 8 | 9 | 10 | 11 | 12 | 13 |
| C.I. Acid Red 289 | 6.0 | 6.0 | | | 6.0 | 6.0 |
| C.I. Direct Blue 199 | | | 6.0 | | | |
| C.I. Direct Yellow 132 | | | | 6.0 | | |
| 3-Methyl-1,5-pentanediol | 10.0 | 10.0 | 10.0 | 10.0 | 15.0 | 16.0 |
| 2-Methyl-1,3-propanediol | | | | | | |
| 2,4-Diethyl-1,5-pentanediol | | | | | | |
| 1,2,6-Trimethyl-1,7-heptanediol | | | | | | |
| Bis(2-hydroxyethyl)sulfone | 5.0 | 5.0 | 5.0 | 5.0 | 5.0 | 5.0 |
| Dimethyl sulfoxide | | | | | | |
| Ethylene urea | 5.0 | 5.0 | 5.0 | 5.0 | 5.0 | 5.0 |
| Dimethyl-imidazolidinone | | | | | | |
| Triethylene glycol | | 5.0 | 5.0 | 5.0 | 5.0 | 5.0 |
| 1,2-Hexanediol | | | | | | |
| 1,5-Pentanediol | | | | | | |
| ACETYLENOL EH (*1) | 0.6 | 0.6 | 0.6 | 0.6 | 0.6 | 0.6 |
| Pure water | 73.4 | 68.4 | 68.4 | 68.4 | 63.4 | 62.4 |
| Characteristics: | | | | | | |
| Content A of branched alkanediol having hydroxyl groups at both terminals of its main chain (% by mass) | 10.0 | 10.0 | 10.0 | 10.0 | 15.0 | 16.0 |
| Content B of compound represented by the general formula (1) (% by mass) | 5.0 | 5.0 | 5.0 | 5.0 | 5.0 | 5.0 |
| Content C of compound represented by the general formula (2) (% by mass) | 5.0 | 5.0 | 5.0 | 5.0 | 5.0 | 5.0 |
| Value of A/(B + C) | 1.00 | 1.00 | 1.00 | 1.00 | 1.50 | 1.60 |

|  | Example | | | | | |
|---|---|---|---|---|---|---|
|  | 14 | 15 | 16 | 17 | 18 | 19 |
| C.I. Acid Red 289 | 6.0 | 6.0 | 6.0 | 6.0 | 6.0 | 6.0 |
| C.I. Direct Blue 199 | | | | | | |
| C.I. Direct Yellow 132 | | | | | | |
| 3-Methyl-1,5-pentanediol | 3.0 | 4.0 | 10.0 | 10.5 | 12.0 | 13.0 |
| 2-Methyl-1,3-propanediol | | | | | | |
| 2,4-Diethyl-1,5-pentanediol | | | | | | |
| 1,2,6-Trimethyl-1,7-heptanediol | | | | | | |
| Bis(2-hydroxyethyl)sulfone | 11.0 | 10.0 | 3.0 | 3.0 | 2.0 | 2.2 |
| Dimethyl sulfoxide | | | | | | |
| Ethylene urea | 11.0 | 10.0 | 2.0 | 2.0 | 2.0 | 2.0 |
| Dimethyl-imidazolidinone | | | | | | |
| Triethylene glycol | 5.0 | 5.0 | 5.0 | 5.0 | 5.0 | 5.0 |
| 1,2-Hexanediol | | | | | | |
| 1,5-Pentanediol | | | | | | |
| ACETYLENOL EH (*1) | 0.6 | 0.6 | 0.6 | 0.6 | 0.6 | 0.6 |
| Pure water | 63.4 | 64.4 | 73.4 | 72.9 | 72.4 | 71.2 |
| Characteristics: | | | | | | |
| Content A of branched alkanediol having hydroxyl groups at both terminals of its main chain (% by mass) | 3.0 | 4.0 | 10.0 | 10.5 | 12.0 | 13.0 |
| Content B of compound represented by the general formula (1) (% by mass) | 11.0 | 10.0 | 3.0 | 3.0 | 2.0 | 2.2 |
| Content C of compound represented by the general formula (2) (% by mass) | 11.0 | 10.0 | 2.0 | 2.0 | 2.0 | 2.0 |
| Value of A/(B + C) | 0.14 | 0.20 | 2.00 | 2.10 | 3.00 | 3.10 |

|  | Comparative Example | | | | | |
|---|---|---|---|---|---|---|
|  | 1 | 2 | 3 | 4 | 5 | 6 |
| C.I. Acid Red 289 | 6.0 | 6.0 | 6.0 | 6.0 | 6.0 | 6.0 |
| C.I. Direct Blue 199 | | | | | | |
| C.I. Direct Yellow 132 | | | | | | |
| 3-Methyl-1,5-pentanediol | 20.0 | | | | | |
| 2-Methyl-1,3-propanediol | | | | | | |
| 2,4-Diethyl-1,5-pentanediol | | | | | | |
| 1,2,6-Trimethyl-1,7-heptanediol | | | | | | |
| Bis(2-hydroxyethyl)sulfone | | 20.0 | | 10.0 | 10.0 | 10.0 |
| Dimethyl sulfoxide | | | | | | |
| Ethylene urea | | | 20.0 | 10.0 | | |
| Dimethyl-imidazolidinone | | | | | | |
| Triethylene glycol | | | | | | |
| 1,2-Hexanediol | | | | | 10.0 | |
| 1,5-Pentanediol | | | | | | 10.0 |
| ACETYLENOL EH (*1) | 0.6 | 0.6 | 0.6 | 0.6 | 0.6 | 0.6 |
| Pure water | 73.4 | 73.4 | 73.4 | 73.4 | 73.4 | 73.4 |
| Characteristics: | | | | | | |
| Content A of branched alkanediol having hydroxyl groups at both terminals of its main chain (% by mass) | 20.0 | 0.0 | 0.0 | 0.0 | 0.0 | 0.0 |
| Content B of compound represented by the general formula (1) (% by mass) | 0.0 | 20.0 | 0.0 | 10.0 | 10.0 | 10.0 |
| Content C of compound represented by the general formula (2) (% by mass) | 0.0 | 0.0 | 20.0 | 10.0 | 0.0 | 0.0 |
| Value of A/(B + C) | — | 0.00 | 0.00 | 0.00 | 0.00 | 0.00 |

(*1): Acetylene glycol ethylene oxide adduct (surfactant available from Kawaken Fine Chemicals Co., Ltd.)

Evaluation

Intermittent Ejection Stability (Low Temperature and Low Humidity):

Ink cartridges for an ink jet recording apparatus (trade name: PIXUS 9900i; manufactured by CANON INC.), which ejects ink by providing the ink with thermal energy, were individually filled with the inks obtained as above. Then, the ink cartridges obtained were each mounted to a conversion machine of the ink jet recording apparatus (trade name: PIXUS 9900i; manufactured by CANON INC.). Next, the ink jet recording apparatus mounted with the ink cartridges were each left to stand in an environment of a temperature of 15° C. and a relative humidity of 10% (low temperature and low humidity) without ejecting any ink for more than five hours and then some ink droplets were ejected under the same environment as above. The ejection of the ink is suspended for five seconds, thereafter, without any restoration operation or the like for the recording head, the ink was ejected using the above ink jet recording apparatus to record vertical ruled lines on recording mediums (trade name: HR-101; available from CANON INC.). The ejection volume of the recording head used in this case was about 2 pL. The recorded images obtained were observed visually or with a 10-power magnifier to evaluate intermittent ejection stability (low temperature and low humidity). The intermittent ejection stability (low temperature and low humidity) was evaluated according to evaluation criteria as shown below. The results of evaluation are shown in Table 2. In the present invention, in the following evaluation criteria, AA, A and B indicate levels of satisfactory performance, where A indicates a good level, and AA an especially good level. C indicates a level that is not tolerable.

AA: No disorder is seen in the vertical ruled lines even when observed with the 10-power magnifier, thus the recording has normally been performable.
A: Any visually observable disorder is not seen.
B: Some disorder is seen at a visually observable level.
C: Non-ejection and disorder are seen in the vertical ruled lines, thus the recording has normally been not performable.

Intermittent Ejection Stability (High Temperature and Low Humidity):

Ink cartridges for an ink jet recording apparatus (trade name: PIXUS 9900i; manufactured by CANON INC.), which ejects ink by providing the ink with thermal energy, were individually filled with the inks obtained as above. Then, the ink cartridges obtained were each mounted to a conversion machine of the ink jet recording apparatus (trade name: PIXUS 9900i; manufactured by CANON INC.). Next, the ink jet recording apparatus mounted with the ink cartridges were each left to stand in an environment of a temperature of 30° C. and a relative humidity of 10% (high temperature and low humidity) without ejecting any ink for more than five hours and then some ink droplets were ejected under the same environment as above. The ejection of the ink is suspended for five seconds, thereafter, without any restoration operation or the like for the recording head, the ink was ejected using the above ink jet recording apparatus to record vertical ruled lines on recording mediums (trade name: HR-101; available from CANON INC.). The ejection volume of the recording head used in this case was about 2 pL. The recorded images obtained were observed visually or with a 10-power magnifier to evaluate intermittent ejection stability (high temperature and low humidity). The intermittent ejection stability (high temperature and low humidity) was evaluated according to evaluation criteria as shown below. The results of evaluation are shown in Table 2. In the present invention, in the following evaluation criteria, AA, A and B indicate levels of satisfactory performance, where A indicates a good level, and AA an especially good level. C indicates a level that is not tolerable.

AA: No disorder is seen in the vertical ruled lines even when observed with the 10-power magnifier, thus the recording has normally been performable.
A: Any visually observable disorder is not seen.
B: Some disorder is seen at a visually observable level.
C: Non-ejection and disorder are seen in the vertical ruled lines, thus the recording has normally been not performable.

Stability of Ink:

7 g each of the inks obtained as above were individually put into laboratory dishes readied separately, and left to stand in an environment of a temperature of 30° C. and a relative humidity of 10% until their contents came to no longer change in mass. Thereafter, how the inks in the laboratory dishes stood was visually observed to evaluate stability of ink. The stability of ink was evaluated according to evaluation criteria as shown below. The results of evaluation are shown in Table 2. In the present invention, in the following evaluation criteria, A and B indicate levels of satisfactory performance, where A indicates a good level. C indicates a level that is not tolerable.

A: The ink stands flowable.
B: Although precipitates are somewhat present, the ink stands flowable.
C: the ink does not stand flowable.

TABLE 2

| | Evaluation results | | |
| --- | --- | --- | --- |
| | Intermittent ejection stability | | |
| | Low temperature/ low humidity | High temperature/ low humidity | Stability of ink |
| Example: | | | |
| 1 | B | B | B |
| 2 | B | B | B |
| 3 | B | B | B |
| 4 | B | A | A |
| 5 | B | A | A |
| 6 | A | A | A |
| 7 | A | A | A |
| 8 | AA | AA | A |
| 9 | AA | AA | A |
| 10 | AA | AA | A |
| 11 | AA | AA | A |
| 12 | AA | AA | A |
| 13 | A | AA | B |
| 14 | A | A | B |
| 15 | AA | AA | A |
| 16 | AA | AA | A |
| 17 | A | AA | A |
| 18 | A | AA | A |
| 19 | A | A | B |
| Comparative Example: | | | |
| 1 | C | C | C |
| 2 | C | C | B |
| 3 | C | C | C |
| 4 | C | C | B |
| 5 | C | C | C |
| 6 | C | B | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-072276, filed Mar. 19, 2008, which is hereby incorporated by reference herein in its entirety.

What is claimed is:

1. An ink jet ink comprising at least a coloring material and a water-soluble organic solvent; wherein
the water-soluble organic solvent comprises a branched alkanediol having hydroxyl groups at both terminals of its main chain and at least one of a compound represented by the following general formula (1) and a compound represented by the following general formula (2):

$$R_1\text{-}[A]\text{-}R_2 \qquad \text{General formula (1)}$$

wherein A is —S—, —S(=O)— or —S(=O)$_2$—; and $R_1$ and $R_2$ are each independently a hydrogen atom, a hydroxyl group, an alkyl group, a hydroxyalkyl group, an alkenyl group, an acyl group, a carbamoyl group, a carboxyl group or a sulfonyl group, provided that $R_1$ and $R_2$ are not simultaneously hydrogen atom(s) and/or hydroxyl group(s); and

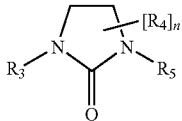

General formula (2)

wherein $R_3$ and $R_5$ are each independently a substituted or unsubstituted alkyl group having 1 to 4 carbon atoms, a hydrogen atom, a hydroxyl group, a carboxyl group or a sulfonyl group; $R_4$ is a hydrogen atom, hydroxyl group, substituted or unsubstituted alkyl group having 1 to 4 carbon atoms, carboxyl group or sulfonyl group which is bonded to any carbon atom except for the nitrogen atoms and carbonyl group that constitute the five-membered ring; and n is an integer of 0 to 4.

2. The ink jet ink according to claim 1, wherein $R_1$ and $R_2$ in the compound represented by the general formula (1) are each independently a hydroxyalkyl group.

3. The ink jet ink according to claim 1, wherein the compound represented by the general formula (2) is ethylene urea.

4. The ink jet ink according to claim 1, wherein the number of carbon atoms of the branched alkanediol having hydroxyl groups at both terminals of its main chain is 9 or less.

5. The ink jet ink according to claim 1, wherein the branched alkanediol having hydroxyl groups at both terminals of its main chain is 3-methyl-1,5-pentanediol.

6. The ink jet ink according to claim 1, wherein the branched alkanediol having hydroxyl groups at both terminals of its main chain is in a content (% by mass) of 15.0% by mass or less with respect to the total mass of the ink.

7. The ink jet ink according to claim 1, wherein content A (% by mass) of the branched alkanediol having hydroxyl groups at both terminals of its main chain, content B (% by mass) of the compound represented by the general formula (1) and content C (% by mass) of the compound represented by the general formula (2) which are with respect to the total mass of the ink satisfy the relationship of $0.2 \leq A/(B+C) \leq 3.0$.

8. The ink jet ink according to claim 1, wherein content A (% by mass) of the branched alkanediol having hydroxyl groups at both terminals of its main chain, content B (% by mass) of the compound represented by the general formula (1) and content C (% by mass) of the compound represented by the general formula (2) which are with respect to the total mass of the ink satisfy the relationship of $0.2 \leq A/(B+C) \leq 2.0$.

9. An ink jet recording method in which an ink is ejected by an ink jet recording head to perform recording; wherein
the ink comprises the ink jet ink according to claim 1.

10. An ink cartridge comprising an ink storage portion storing an ink therein; wherein
the ink comprises the ink jet ink according to claim 1.

11. A recording unit comprising an ink storage portion storing an ink therein and a recording head for ejecting the ink therefrom; wherein
the ink comprises the ink jet ink according to claim 1.

12. An ink jet recording apparatus comprising an ink storage portion storing an ink therein and a recording head for ejecting the ink therefrom; wherein
the ink comprises the ink jet ink according to claim 1.

13. The ink jet ink according to claim 1, wherein the ink comprises both the compound represented by the general formula (1) and the compound represented by the general formula (2).

14. The ink jet recording method according to claim 9, wherein an ejection volume of the recording head is 5 pL or less.

15. The ink jet recording apparatus according to claim 12, wherein an ejection volume of the recording head is 5 pL or less.

\* \* \* \* \*